United States Patent
Albanese et al.

(10) Patent No.: US 8,599,728 B2
(45) Date of Patent: Dec. 3, 2013

(54) RECOVERY SCHEMES FOR GROUP SWITCHING PROCEDURES FOR MULTI-GROUP FREQUENCY DIVISION DUPLEX WIRELESS NETWORKS

(75) Inventors: Roberto Albanese, Espoo (FI); Andrea Bacioccola, Helsinki (FI); Zexian Li, Espoo (FI); Aik Chindapol, Washington, DC (US)

(73) Assignee: Nokia Siemens Networks Oy, Espoo (FI)

( * ) Notice: Subject to any disclaimer, the term of this patent is extended or adjusted under 35 U.S.C. 154(b) by 339 days.

(21) Appl. No.: 12/498,634

(22) Filed: Jul. 7, 2009

(65) Prior Publication Data

US 2010/0008326 A1     Jan. 14, 2010

Related U.S. Application Data

(60) Provisional application No. 61/080,204, filed on Jul. 11, 2008.

(51) Int. Cl.
| | | |
|---|---|---|
| *H04J 1/00* | (2006.01) | |
| *H04J 3/24* | (2006.01) | |
| *H04L 5/14* | (2006.01) | |
| *H04W 72/00* | (2009.01) | |
| *H04B 7/00* | (2006.01) | |

(52) U.S. Cl.
USPC ........... 370/281; 370/295; 370/343; 370/349; 455/450; 455/509; 455/518

(58) Field of Classification Search
USPC .......... 370/281, 295, 343, 349; 455/450, 509, 455/518
See application file for complete search history.

(56) References Cited

U.S. PATENT DOCUMENTS

| | | | |
|---|---|---|---|
| 6,272,117 B1 | 8/2001 | Choi et al. | |
| 6,711,416 B1 * | 3/2004 | Zhang | 455/522 |
| 6,826,400 B1 * | 11/2004 | Cashman et al. | 455/434 |
| 6,909,691 B1 * | 6/2005 | Goyal et al. | 370/230 |
| 6,990,090 B2 | 1/2006 | Meier | |

(Continued)

FOREIGN PATENT DOCUMENTS

| | | |
|---|---|---|
| DE | 10053809 A1 | 5/2002 |
| EP | 1389853 A1 | 2/2004 |

(Continued)

OTHER PUBLICATIONS

"DL/UL Offset FDD/H-FDD Frame Structure for Release 1.x: Harmonized Proposal", WiMAX Forum on Alcatel-Lucent, Oct. 2, 2007, pp. 1-9.

(Continued)

*Primary Examiner* — Alpus H Hsu
*Assistant Examiner* — Yee Lam
(74) *Attorney, Agent, or Firm* — Brake Hughes Bellermann LLP

(57) ABSTRACT

Various example embodiments are disclosed herein. According to an example embodiment, a method may include receiving at a mobile station from a base station in a wireless network, a message including a group switch instruction instructing the mobile station to switch from a current group to a new group, attempting, by the mobile station, to switch to the new group in response to receiving the group switch instruction, and sending, from the mobile station, an acknowledgement message that acknowledges either the success or failure of the attempting to switch to the new group.

16 Claims, 13 Drawing Sheets

(56) References Cited

U.S. PATENT DOCUMENTS

| | | | |
|---|---|---|---|
| 7,113,495 | B2 | 9/2006 | Furukawa |
| 7,646,752 | B1 | 1/2010 | Periyalwar et al. |
| 7,889,713 | B2 | 2/2011 | Zheng et al. |
| 8,175,024 | B2 | 5/2012 | Saifullah et al. |
| 2002/0018448 | A1 | 2/2002 | Amis et al. |
| 2002/0080736 | A1 | 6/2002 | Furukawa |
| 2002/0102948 | A1 | 8/2002 | Stanwood et al. |
| 2002/0191573 | A1 | 12/2002 | Whitehill et al. |
| 2003/0091014 | A1 | 5/2003 | Meier |
| 2004/0025018 | A1 | 2/2004 | Haas et al. |
| 2004/0109493 | A1 | 6/2004 | Blessent et al. |
| 2004/0170147 | A1 | 9/2004 | Take |
| 2005/0058151 | A1 | 3/2005 | Yeh |
| 2005/0064818 | A1 | 3/2005 | Assarsson et al. |
| 2005/0117539 | A1 | 6/2005 | Song et al. |
| 2005/0232183 | A1 | 10/2005 | Sartori et al. |
| 2005/0286547 | A1 | 12/2005 | Baum et al. |
| 2006/0029011 | A1 | 2/2006 | Etemad et al. |
| 2006/0107166 | A1 | 5/2006 | Nanda |
| 2006/0176973 | A1 | 8/2006 | Alamouti et al. |
| 2007/0076663 | A1 | 4/2007 | Qi et al. |
| 2007/0097915 | A1 | 5/2007 | Papasakellariou |
| 2007/0097945 | A1 | 5/2007 | Wang et al. |
| 2007/0110016 | A1 | 5/2007 | Shen et al. |
| 2007/0121546 | A1 | 5/2007 | Zuckerman et al. |
| 2007/0127374 | A1* | 6/2007 | Black ............................ 370/229 |
| 2008/0002610 | A1 | 1/2008 | Zheng et al. |
| 2008/0039014 | A1 | 2/2008 | Tsai et al. |
| 2008/0043702 | A1 | 2/2008 | Moon et al. |
| 2008/0056193 | A1 | 3/2008 | Bourlas et al. |
| 2008/0056199 | A1 | 3/2008 | Park et al. |
| 2008/0069067 | A1 | 3/2008 | Sood et al. |
| 2008/0075184 | A1* | 3/2008 | Muharemovic et al. ...... 375/260 |
| 2008/0089309 | A1 | 4/2008 | Groleau et al. |
| 2008/0117854 | A1 | 5/2008 | Saifullah et al. |
| 2008/0247375 | A1* | 10/2008 | Muharemovic et al. ...... 370/344 |
| 2008/0268844 | A1 | 10/2008 | Ma et al. |
| 2008/0285500 | A1* | 11/2008 | Zhang et al. ................... 370/315 |
| 2008/0291847 | A1 | 11/2008 | Zheng |
| 2009/0029706 | A1* | 1/2009 | Prakash et al. ................ 455/436 |
| 2009/0092066 | A1 | 4/2009 | Chindapol et al. |
| 2009/0092067 | A1* | 4/2009 | Sudarshan et al. ............ 370/281 |
| 2009/0135744 | A1 | 5/2009 | Chaudhri et al. |
| 2009/0213766 | A1 | 8/2009 | Chindapol et al. |
| 2009/0219841 | A1 | 9/2009 | Sudarshan et al. |
| 2009/0268641 | A1* | 10/2009 | Yim et al. ...................... 370/277 |
| 2009/0268645 | A1 | 10/2009 | Chindapol et al. |
| 2009/0279488 | A1* | 11/2009 | Zheng et al. ................... 370/329 |
| 2009/0325578 | A1 | 12/2009 | Li et al. |
| 2010/0177717 | A1* | 7/2010 | Sung et al. ..................... 370/329 |
| 2010/0195546 | A1* | 8/2010 | Chun et al. ..................... 370/281 |
| 2013/0012210 | A1 | 1/2013 | Li et al. |

FOREIGN PATENT DOCUMENTS

| | | |
|---|---|---|
| EP | 1524800 A2 | 4/2005 |
| EP | 1912390 A1 | 4/2008 |
| JP | 04-341031 A | 11/1992 |
| JP | 11-177622 A | 7/1999 |
| JP | 2001-237875 A | 8/2001 |
| WO | 99/14897 | 3/1999 |
| WO | 00/55640 A1 | 9/2000 |
| WO | 2006/023771 A2 | 3/2006 |
| WO | 2006/096728 A2 | 9/2006 |
| WO | 2008/004062 A2 | 1/2008 |
| WO | 2008/004066 A2 | 1/2008 |
| WO | 2008/047203 A2 | 4/2008 |
| WO | 2009/047709 A2 | 4/2009 |
| WO | 2009/047709 A3 | 8/2009 |

OTHER PUBLICATIONS

Search Report and Written Opinion received for International Application No. PCT/IB2008/054113, mailed on Jun. 19, 2009, pp. 16.

"R1.x FDD/Full Duplex-Current status and open issues", WiMAX Forum, Mar. 12, 2008, 15 pages.

"R1.x FDD/HFDD Ad Hoc Mar. 2008 Recommendation to TWG", WiMAX Forum, Mar. 14, 2008, 5 pages.

"WiMAX FDD Proposal for Rel 1.x", WiMAX Forum, Motorola, 2004, 6 pages.

Zheng, Haihong et al., "Transmission Scheme of MAC Management Message towards a RS Group in multi-hop relay System", IEEE 802.16 Broadband Wireless Access Working Group, Jan. 8, 2007, 9 pages.

Yagahoobi, Hassan, "R1.5 FDD/HFDD Ad Hoc Apr. 2008 Opening Report", WiMAX Forum, Intel Corporation, Apr. 28, 2008, 5 pages.

Zheng, Haihong et al., "Harq with Relays", IEEE 802.16 Presentation Submission Template (Rev. 8.3), Nov. 7, 2006, 12 pages.

Axnas, J. et al., "Final report on identified RI key technologies system concept and their assessment", Winner, D2.10 version 1.0, Dec. 23, 2005, pp. 1-2, 38-39 and 83-96.

Bacioccola, Andrea et al., "R1.x FDD/Full Duplex—Current status and open issues", WiMAX Forum, Nokia, Mar. 15, 2008, 15 pages.

Bacioccola, Andrea et al., "R1.x FDD/Full Duplex-Current Status and Open Issues", WiMAX Forum, Nokia and NSN, Apr. 15, 2008, 8 pages.

Bacioccola, Andrea et al., "R1.x FDD/Full Duplex-Current Status", WiMAX Forum, Nokia, NSN and Huawei, Apr. 15, 2008, 13 pages.

Campbell, Andrew T., et al., "Spawning Networks", IEEE Network, IEEE Inc. New York, US, Jul./Aug. 1999, pp. 16-29.

Chion, Mary et al., "Fix for Problems in UL Allocation", IEEE 802.16 Broadband Wireless Access Working Group, Jun. 12, 2005, pp. 1-4.

European Search Report received from EP Application No. EP 02018385, mailed on Jan. 29, 2003, 3 pages.

Gal, Dan et al., "Support of Full Duplex MS (OFDMA FDD) in draft IEEE 802.16Rev2/D4", WiMAX Forum, Alcatel-Lucent, Apr. 7, 2008, pp. 1-6.

"Part 16: Air Interface for Fixed Broadband Wireless Access Systems", IEEE Standard 802.16 (Revision of IEEE Std 802.16-2001), IEEE Standards for Local and Metropolitan area networks, Oct. 1, 2004, 894 pages.

Johnson, David. B. et al., "Dynamic Source Routing in Ad Hoc Wireless Networks", Carnegie Mellon University, 1995, pp. 1-18.

Kim, Kyung-Ah et al., "A Seamless Handover Mechanism for IEEE 802.16e Broadband Wireless Access", School of Electrical Engineering and Computer Science, Seoul National University, Seoul, Republic of Korea, Feb. 28, 2005, pp. 1-8.

Marks, Roger, "IEEE Standard 802.16: A Technical Overview of the WirelessMAN Air Interface for Broadband Wireless Access", IEEE 802.16 Broadband Wireless Access Working Group, Jun. 4, 2002, pp. 98-107.

McBeath, Sean et al., "DCD/UCD Consideration for FDD", WiMAX Forum, Huawei, 2006, 5 pages.

McBeath, Sean et al., "Serving F-FDD Mobile Stations v2", WiMAX Forum, Huawei, 2006, 5 pages.

Otyakmaz, Arif et al., "Parallel operation of half- and full-duplex FDD in future multi-hop mobile radio networks", Jun. 22, 2008, pp. 1-7.

Pabst, Ralf, "Realy-Based Deployment Concepts for Wireless and Mobile Broadband Radio", IEEE Communications Magazine, Wireless World Research Forum, Sep. 2004, pp. 80-89.

Saifullah, Yousuf et al., "Clarification on CDMA Codes TLV", IEEE 802.16 Broadband Wireless Access Working Group, Jul. 13, 2007, pp. 1-3.

Saifullah, Yousuf et al., "Resource Request for Bandwidth", IEEE 802.16 Presentation Submission Template (Rev 8.3), Nov. 15, 2006, 8 pages.

Saifullah, Yousuf et al., "Resource Request for Bandwidth", IEEE 802.16 Broadband Wireless Access Working Group, Jan. 18, 2007, pp. 1-9.

Schultz, D. et al., "Proposal of the best suited deployment concepts for the identified scenarios and related RAN protocols", Winner, D3.5 version 1.0, Dec. 31, 2005, pp. 1-2, 58-67, and 93-97.

Seol, Ji-Yun, "Rel1.x FDD/HFDD Flexible UL allocation signaling for F-FDD MS in H-FDD frame structure", WiMAX Forum, Samsung Electronics, Apr. 2008, 9 pages.

(56) References Cited

OTHER PUBLICATIONS

Villela, Daniel et al., "Virtuosity: Programmable Resource Management for Spawning Networks", Computer Networks, Elsevier Science Publishers B.V., Amsterdam, NL, vol. 36, No. 1, Jun. 2001, pp. 1-29.
Wiemann, Henning et al., "A Novel Multi-Hop ARQ Concept", Vehicular Technology Conference, IEEE 61st VTC 2005-Spring, Jun. 1, 2005, pp. 3097-3101.
Xu, Allan et al., "R1.x FDD/Full Duplex Additional Option for 2 MAP Approach", WiMAX Forum, Huawei, Apr. 28, 2008, 4 pages.
Bacioccola, Andrea et al., "R1.x FDD/Full Duplex—Current status and open issues", WiMAX Forum, Mar. 12, 2008, 15 pages.
Final Office Action for U.S. Appl. No. 11/549,387, mailed on Aug. 5, 2010, 7 pages.
Non-Final Office Action for U.S. Appl. No. 11/871,649, mailed on Oct. 19, 2010, 24 pages.
Non-Final Office Action for U.S. Appl. No. 11/480,767, mailed Aug. 18, 2010, 18 Pages.
Final Office Action for U.S. Appl. No. 12/035,262, mailed on Dec. 10, 2010, 24 pages.
"Draft Standard for Local and Metropolitan area Networks", Part 16: Air Interface for Broadband Wireless Access Systems, IEEE Computer Society P802.16Rev2/D2, Dec. 2007, pp. 114-536 (Section 6.3), 742-1079 (Section 8.4), and 1107-1263 (Section 11).
Office Action for Russian Application No. 2009117689 (including English Translation), mailed on Aug. 13, 2010, 5 pages.
"6.3.2.3.5 Ranging Request (RNG-REQ) message", IEEE, Air Interface for Fixed Broadband Wireless Access Systems, IEEE Std 802.16-2004, 2004, p. 49.
Non-Final Office Action Response for U.S. Appl. No. 12/049,265, filed on Jan. 18, 2011, 15 pages.
Final Office Action for U.S. Appl. No. 12/049,265, mailed on Mar. 18, 2011, 19 pages.
Gal, "Support of Full Duplex MS (OFDMA FDD) in draft IEEE 802.16Rev21D4", Alcatel-Lucent, Apr. 7, 2008, 6 pages.
Schults, et al, "Proposal of the best suited deployment concepts for the identified scenarios and related ran protocol", IST-2003-507581 Winner, D3.5 version 1.0, Jan. 5, 2006, 150 pages.
Non-Final Office Action Response for U.S. Appl. No. 11/871,649, filed on Mar. 30, 2011, 22 pages.
IEEE, "Part 16: Air Interface for Broadband Wireless Access Systems", DRAFT Standard for Local and Metropolitan Area Networks, P802.16Rev2/D5 (Jun. 2008), 83 pgs.
U.S. Appl. No. 12/035,262, filed Feb. 21, 2008, 67 pgs.
U.S. Appl. No. 12/049,265, filed Mar. 14, 2008, 69 pgs.
U.S. Appl. No. 11/871,649, filed Oct. 12, 2007, 45 pgs.
U.S. Appl. No. 12/163,084, filed Jun. 27, 2008, 65 pgs.
Non-Final Office Action for U.S. Appl. No. 12/049,265, mailed on Jul. 22, 2010, 25 pages.
Schultz, D., et al., "Proposal of the best suited deployment concepts for the identified scenarios and related RAN protocols", IST-2003-507581, Winner, D3.5, version 1.0, May 1, 2006, 150 pages.
Jang, Heejin, et al., "Mobile IPv6 Fast Handovers Over IEEE 802.16e Networks", MIPSHOP Working Group, Internet Draft, Nov. 16, 2007, pp. 1-18.
U.S. Appl. No. 11/871,649 Final Office Action Mailed Jun. 7, 2011, 17 pages.
U.S. Appl. No. 12/049,265 Notice of Allowance mailed Oct. 13, 2011, 20 pages.
U.S. Appl. No. 12/163,084 Non Final Office Action mailed Oct. 27, 2011, 11 pages.
U.S. Appl. No. 12/035,262 Notice of Allowance mailed Jan. 9, 2012, 11 pages.
Notice of Allowance received for U.S. Appl. No. 11/871,649, mailed on Feb. 21, 2012, 24 pages.
Request for Continued Examination and Response to Final Office Action filed for U.S. Appl. No. 11/871,649, filed on Dec. 7, 2011, 13 pages.
Non-Final Office Action received for U.S. Appl. No. 12/035,262, mailed on Apr. 8, 2010, 32 pages.
Request for Continued Examination and Response to Final Office Action filed for U.S. Appl. No. 12/035,262, filed on Apr. 11, 2011, 15 pages.
Response to Final Office Action filed for U.S. Appl. No. 12/049,265, filed on Aug. 18, 2011, 14 pages.
Gang, Shen, et al., "Recommendations on IEEE 802.16j", IEEE 802.16 Presentation Submission Template (Rev. 8.3), IEEE C802.16j-06/004r1, Alcatel, Research & Innovation, May 8, 2006, 15 pages.
IEEE, "Part 16: Air Interface for Fixed and Mobile Broadband Wireless Access Systems", Multihop Relay Specification, Baseline Document for Draft Standard for Local and Metropolitan Area Networks, 802.16j-06/026r4, Jun. 6, 2007, 203 pages.
Response to Office Action filed for Korean Patent Application No. 2008-7031880, filed on Jun. 20, 2011, 29 pages including 10 pages of English translation.
Notice of Allowance received for Korean Patent Application No. 2008-7031888, mailed on Aug. 10, 2011, 3 pages including 1 of pages of English translation.
Office Action received for Korean Patent Application No. 2008-7031888, mailed on Apr. 20, 2011, 4 pages including 1 page of English translation.
Notice of Allowance received for Japanese Patent Application No. 2009-517470, mailed on Nov. 11, 2011, 5 pages including 2 pages of English translation.
Office Action received for Japanese Patent Application No. 2009-517470, mailed on Jun. 13, 2011, 16 pages including 11 pages of English translation.
Notice of Allowance received for Japanese Patent Application No. 2009-517471, mailed on Nov. 11, 2011, 5 pages including 2 pages of English translation.
Office Action received for Japanese Patent Application No. 2009-517471, mailed on Jun. 13, 2011, 9 pages including 6 pages of English translation.
Office Action received for Indonesian Patent Application No. W00200804069, mailed on Apr. 11, 2011, 4 pages including 2 pages on English translation.
Office Action received for Korean Patent Application U.S. Appl. No. 2008-7031882, mailed Sep. 30, 2011, 8 pages including 4 pages of English translation.
Office Action received for Chinese Patent Application No. 200780024815.1, mailed on Apr. 26, 2011, 19 pages including 10 pages of English translation.
Office Action received for Chinese Patent Application No. 200780024974.1, mailed on Apr. 20, 2011, 9 pages including 6 pages of English translation.
Office Action received for Indonesian Patent Application No. W00200804127, mailed on Feb. 17, 2011, 6 pages including 3 pages of English translation.
Office Action received for Israel Patent Application Serial No. 195928, mailed on Feb. 24, 2010, 2 pages (English translation only).
Office Action for Korean Patent Application No. 2008-7031882, mailed on Nov. 29, 2010, 4 pages including 1 page of English translation.
Final Office Action received for U.S. Appl. No. 12/163,084, mailed on May 23, 2012, 16 pages.
Non-Final Office Action received for U.S. Appl. No. 13/618,828, mailed Dec. 6, 2012, 21 pages.

* cited by examiner

RECOVERY SCHEMES FOR GROUP SWITCHING PROCEDURES FOR MULTI-GROUP FREQUENCY DIVISION DUPLEX WIRELESS NETWORKS

PRIORITY CLAIM

This application claims priority to U.S. Provisional application Ser. No. 61/080,204 filed on Jul. 11, 2008, entitled "Recovery Schemes For Group Switching Procedures For Multi-Group Frequency Division Duplex Wireless Networks," hereby incorporated by reference.

TECHNICAL FIELD

This description relates to wireless networks.

BACKGROUND

In some types of wireless networks, mobile stations (MSs) may be divided up into two groups (for example) to provide a more efficient use of channel resources, so that a base station (BS) may allocate the uplink carrier frequency and the downlink carrier frequency resources to different groups at a time, or in an alternating or interleaved fashion, to allow half-duplex (HD) MSs to use both the uplink and downlink resources. For example, HD-Frequency Division Duplex MSs may either transmit (e.g., via a first frequency range) or receive (e.g., via a second frequency range) at one time, but typically cannot both transmit and receive at the same time. Full-Duplex (FD) MSs can typically transmit and receive (e.g., on different frequencies) at the same time. However, challenges remain in determining how to allocate or assign HD MSs to different groups.

SUMMARY

According to an example embodiment, a method may include receiving at a mobile station from a base station in a wireless network, a message including a group switch instruction instructing the mobile station to switch from a current group to a new group, attempting, by the MS, to switch to the new group in response to receiving the group switch instruction, and sending, from the mobile station, an acknowledgement message that acknowledges either the success or failure of the attempting to switch to the new group.

According to an example embodiment, an apparatus may include a controller and a wireless transmitter and receiver. The wireless receiver, under control of the controller, may be configured to receive, at a mobile station from a base station in a wireless network, a message including a group switch instruction instructing the mobile station to switch from a current group to a new group. The controller and the wireless receiver may be configured to attempt, by the mobile station, to switch to the new group in response to receiving the group switch instruction. And, the wireless transmitter, under control of the controller, may be configured to send, from the mobile station, an acknowledgement message that acknowledges either the success or failure of the attempting to switch to the new group.

According to another example embodiment, an apparatus may include means for receiving, at a mobile station from a base station in a wireless network, a message including a group switch instruction instructing the mobile station to switch from a current group to a new group, means for attempting, by the mobile station, to switch to the new group in response to receiving the group switch instruction, and means for sending, from the mobile station, an acknowledgement message that acknowledges either the success or failure of the attempting to switch to the new group.

According to another example embodiment, a method may include sending, from a base station to a mobile station in a wireless network, a first message including a group switch instruction instructing the mobile station to switch from a current group to a new group, and receiving, at the base station from the mobile station, an second message (e.g., data packet, control message or management message or other signal) that indicates (or acknowledges) either a success or failure of the mobile station in switching to the new group. For example, the second message may be sent via a resource of the new group, the current group, or a common resource or region that may be available for use by mobile stations regardless of group association, or other resource allocated by the base station. In an example embodiment, receiving the second message may include, for example, receiving either a group switch acknowledgement that acknowledges that the mobile station has switched to the new group, or a group switch negative acknowledgement message that indicates that the mobile station has not switched and/or is unable to switch to the new group.

According to an example embodiment, an apparatus may include a controller and a wireless transmitter and receiver. The wireless transmitter, under control of the controller, may be configured to send, from a base station to a mobile station in a wireless network, a message including a group switch instruction instructing the mobile station to switch from a current group to a new group. And, the wireless receiver, under control of the controller, may be configured to receive, at the base station from the mobile station, an acknowledgement message that acknowledges either a success or failure of the mobile station in switching to the new group.

According to an example embodiment, an apparatus may include a means for sending, from a base station to a mobile station in a wireless network, a message including a group switch instruction instructing the mobile station to switch from a current group to a new group; and, means for receiving, at the base station from the mobile station, an acknowledgement message that acknowledges either a success or failure of the mobile station in switching to the new group.

According to another example embodiment, a method may include receiving, at a mobile station from a base station in a wireless network, a message including a group switch instruction instructing the mobile station to switch from a current group to a new group, switching, by the mobile station, to the new group in response to receiving the group switch instruction, and sending a communication, from the mobile station via uplink resources associated with the new group, that indicates that the mobile station has switched to the new group. Alternatively, the communication that indicates that the mobile station has switched to the new group may be sent via a resource allocated by the base station, such as a current group resource, a new group resource, a common resource that may be used by mobile stations regardless of group association, or other allocated resource. The communication that indicates that the mobile station has switched may include, as examples, a group switch acknowledgement message, a control message, a management message, a bandwidth request message requesting zero or more resources, a data packet, or a tone or signal.

According to another example embodiment, a method may include sending, from a base station to a mobile station in a wireless network, a message including a group switch instruction instructing the MS to switch from a current group to a new group, allocating, by the base station to the mobile station, uplink resources associated with the new group, and receiving a packet by the base station via the allocated uplink resources associated with the new group that indicates that the mobile station has switched to the new group. Alternatively, the allocating may include allocating, by the base station, uplink resources associated with either the new group, the current group, a common resource, or other resource allocation, for example. Thus, the receiving may alternatively include receiving a packet by the base station via the allocated resource, where the allocated resource may be from the new group, the current group, from a common resource or region, or other resource allocation.

According to an example embodiment, an article may be provided that includes: a storage medium, the storage medium including stored thereon instructions that, when executed by a processor or controller, result in: sending, from a base station to a mobile station in a wireless network, a message including a group switch instruction instructing the mobile station to switch from a current group to a new group; allocating, by the base station to the mobile station, uplink resources associated with the new group; and receiving a packet by the base station via the allocated uplink resources associated with the new group that indicates that the mobile station has switched to the new group.

According to another example embodiment, a method may include receiving, at a mobile station from a base station in a wireless network, a message including a group switch instruction instructing the mobile station to switch from a current group to a new group, determining, by the mobile station, that the mobile station is unable to switch to the new group, and sending, from the mobile station to the base station, a group switch negative acknowledgement that indicates that the mobile station has not switched and/or is unable to switch to the new group.

According to yet another example embodiment, a method may include receiving, at a mobile station from a base station in a wireless network, a message including a group switch instruction instructing the mobile station to switch from a current group to a new group, determining, by the mobile station, that the mobile station is unable to switch to the new group, and sending a communication (e.g., data packet, message, or other signal), from the mobile station to the base station via a current group resource, the communication indicating that the mobile station has not switched and/or is unable to switch to the new group.

According to yet another example embodiment, a method may include receiving, at a mobile station from a base station in a wireless network, a message including a group switch instruction instructing the mobile station to switch from a current group to a new group, the wireless network including multiple groups, with one of the groups being a reliable group, determining that the mobile station is unable to switch to the new group, switching to the reliable group if the new group is not the reliable group; and otherwise, performing network re-entry if the new group is the reliable group. In yet another example embodiment, a method may include receiving, at a mobile station from a base station in a wireless network, a message including a group switch instruction instructing the mobile station to switch from a current group to a new group, determining, by the mobile station, that the mobile station is unable to switch to the new group, and sending a communication, from the mobile station to the base station via either a new group resource, a current group resource or other resource allocated by the base station, the communication indicating that the mobile station has not switched and/or is unable to switch to the new group.

The details of one or more implementations are set forth in the accompanying drawings and the description below. Other features will be apparent from the description and drawings, and from the claims.

DETAILED DESCRIPTION

Figure 1:
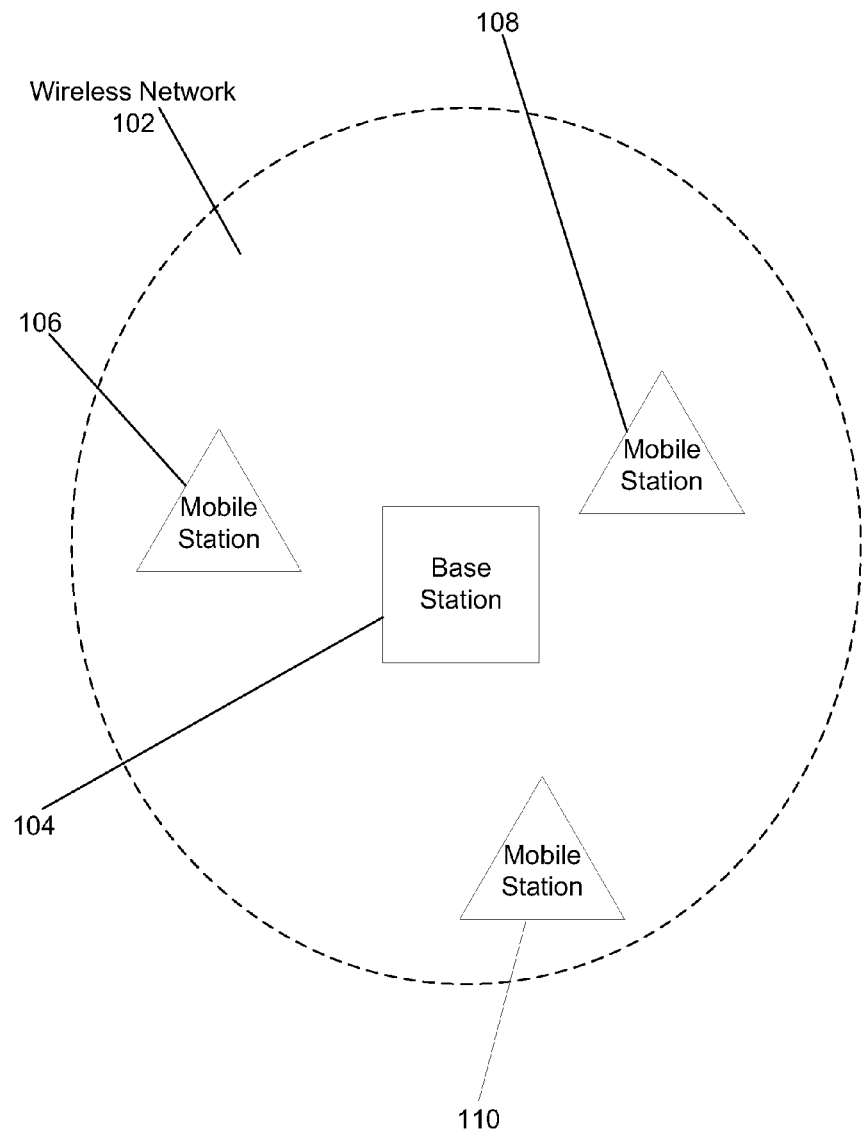
FIG. 1 is a block diagram of a wireless network according to an example embodiment.

FIG. 1 is a block diagram of a wireless network 102 including a base station 104 and three mobile stations 106, 108, 110 according to an example embodiment. While only three mobile stations are shown, any number may be provided. Although not shown, mobile stations 106, 108 and 110 may be coupled to base station 104 via relay stations or relay nodes, for example. The wireless network 102 may include, for example, an IEEE 802.16 IEEE 802.16 Worldwide interoperability for Microwave Access (WiMAX) network, an IEEE 802.11 Wireless Local Area Network (WLAN) network, a cellular telephone network, or other wireless network, according to example embodiments. The base station 104 may include a cellular or WiMAX base station (BS), a node B, an 802.11 access point, a relay station, or other infrastructure node, according to various example embodiments. The term "base station" (BS) may be used herein and may include any type of infrastructure node. The mobile stations 106, 108, 110 may include laptop or notebook computers, smartphones, personal digital assistants (PDAs), cellular telephones, WiMAX device, subscriber station, or any other wireless device, according to example embodiments. The term "wireless node" (or "wireless station") may include any type of wireless node, such as base stations, mobile stations, relay stations, etc. Base station (BS) 104 may transmit information (e.g., either broadcast, multicast or unicast) in a downlink (DL) direction to each mobile station (MS) 106, 108, 110, and each MS 106, 108, 110 may transmit information to the BS 104 in an uplink (UL) direction. While the present disclosure may use some of the terminology of WiMAX or other wireless standards or specifications, the present disclosure may be applicable to any networking or wireless technologies.

According to an example embodiment, mobile stations in a frequency-division duplex (FDD) wireless network may, for example, be divided up into two (or more) groups (for example) to provide a more efficient use of channel resources, so that a base station (BS) may allocate the uplink carrier frequency and the downlink carrier frequency resources to different groups at a time, or in an alternating or interleaved fashion, to allow HD (half-duplex) MSs to use both the uplink and downlink resources. Two groups (e.g., group 1 and group 2) are described herein as an example, but any number of groups may be used. For example, during one time period, a first group (or group 1 of HD MSs) of mobile stations may receive in a downlink direction, while a second group (group 2 of HD MSs) of mobile stations is allowed to transmit in an uplink direction to the BS or infrastructure node. Then, during a second time period, the first group may transmit and the second group may receive. Thus, Frequency Division Duplexing may be used to provide different uplink and downlink carrier frequencies or resources, which may allow some MSs to transmit, while other MSs are receiving, for example.

Figure 2:
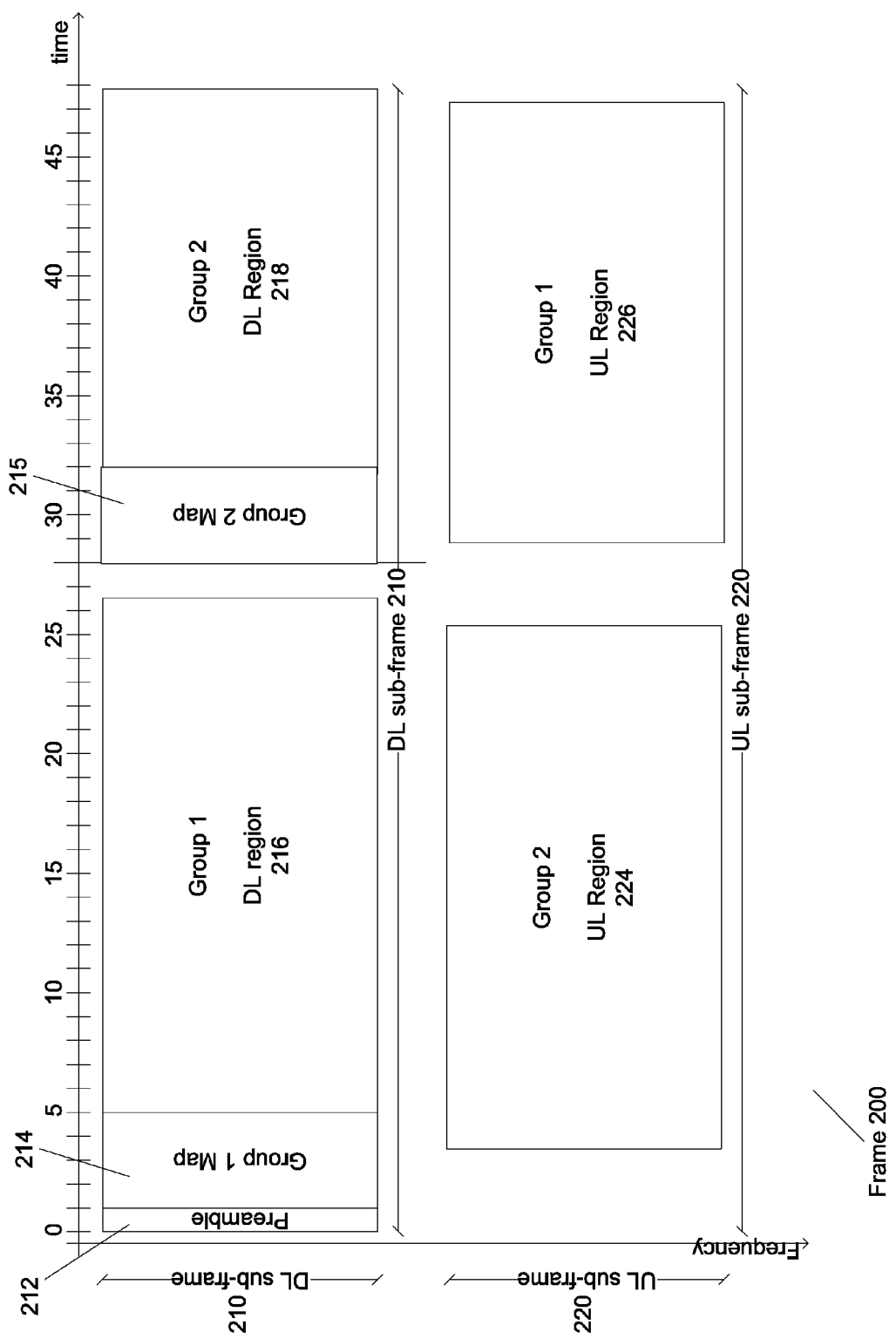
FIG. 2 is a diagram illustrating an example embodiment of a frame that may be used according to an example embodiment.

FIG. 2 is a diagram illustrating an example embodiment of a frame. The example frame 200 may include a DL (downlink) sub-frame 210 that includes signals transmitted from a base station and received at one or more mobile stations. Frame 200 may include an UL (uplink) sub-frame 220 that includes signals transmitted from one or more mobile stations and received by a base station. The frame 200 illustrates an example of a FDD system in which one or more mobile stations may receive DL signals via a first frequency (e.g., f1), or first set of frequencies, within a DL sub-frame 210, and may transmit signals UL to a base station via a second frequency (e.g., f2), or second set of frequencies, within an UL sub-frame 220. Other types of frames may be used as well, as the frame 200 is merely an example.

The DL sub-frame 210 may include a common preamble 212, since preamble 212 is directed to all groups (e.g., directed to mobile stations for both group 1 and group 2). The preamble 212 may allow mobile stations to perform synchronization. A group-specific Map may be provided for each DL region of frame 200. For example, a group 1 DL region 216 may include a group 1 Map 214, while a group 2 DL region 218 may include a group 2 Map 215. Each Map may include a DL Map and an UL Map, each including information elements identifying resources for downlink and uplink transmissions for one or more mobile stations. Each Map (e.g., Maps 214 and Map 215) may, for example, include Map IEs (information elements) that allocate resources for uplink and/or downlink transmissions for one or more mobile stations. The uplink (UL) sub-frame 220 may include resources (e.g., OFDM symbols) that allow mobile stations to transmit data to a base station.

The Maps may also provide the grouping information of mobile stations to different groups. The Maps may also include an indication for changing the mobile station from one zone/group to another zone/group.

The UL sub-frame 220 may include at the beginning a switching period (TTG, or BS transmit/receive transition gap). The UL sub-frame 220 may also include a group 2 UL region 224 to allow mobile stations of group 2 to transmit to the base station, and a group 1 UL region 226 to allow group 1 mobile stations to transmit to the base station. In some cases, Full-Duplex (FD) mobile stations (having the ability to transmit and receive on different frequencies at the same time) may receive data during either group 1 DL region 216 and/or group 2 DL region 218, and may transmit (or obtain resources for UL transmission) to the BS via either group 2 UL region 224 and/or group 1 UL region 226. In case of FD networks, the BS may allow FD MS (full-duplex mobile station) to transmit or receive data during the gaps (e.g., between groups' boundary). In another example embodiment, a BS may allow a FD MS to transmit at any time within a frame, e.g., via either group 2 UL region 224, and/or group 1 UL region 226 and/or even out of these group UL regions.

Figure 3:
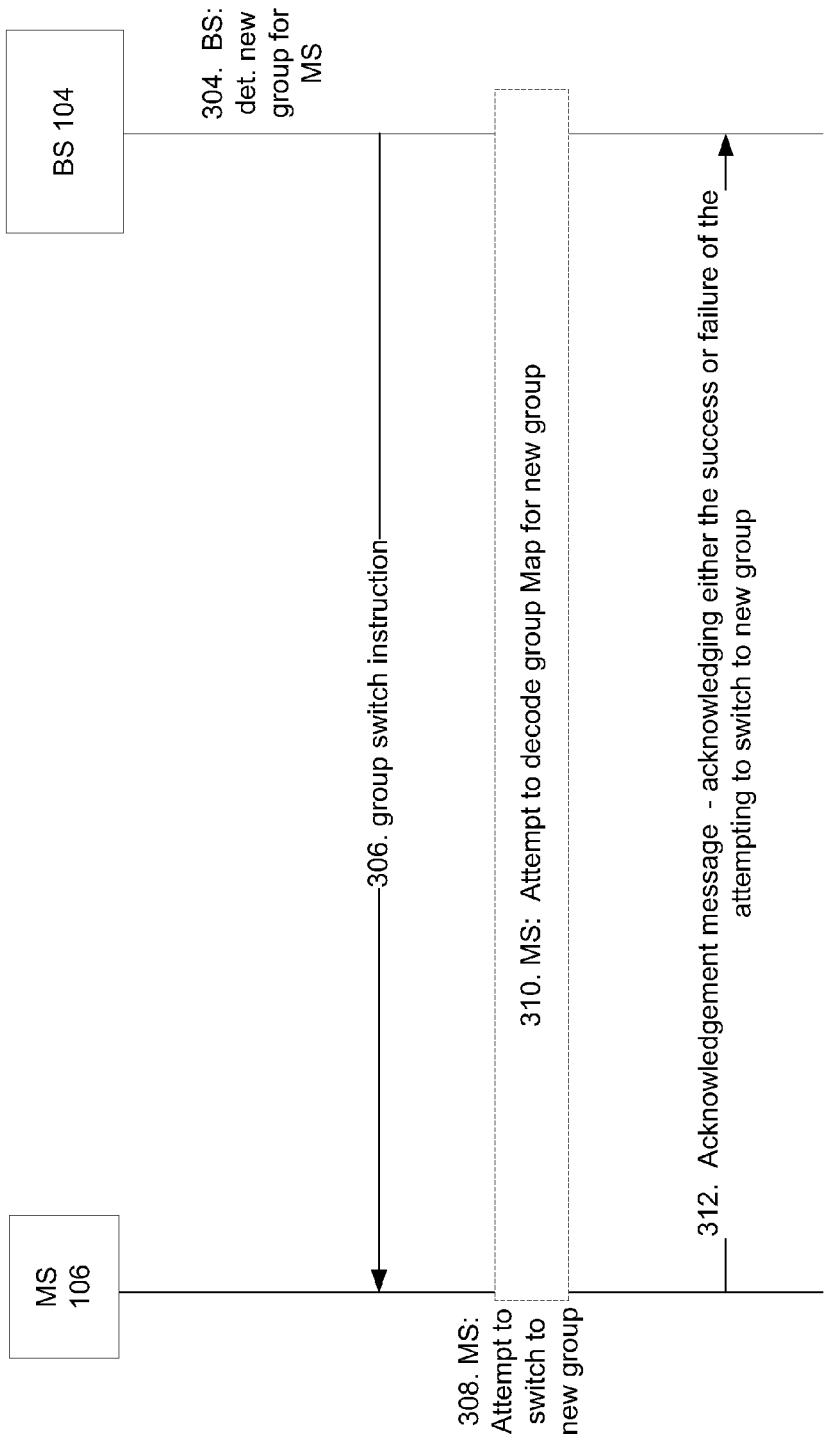
FIG. 3 is a timing diagram illustrating operation of a system according to an example embodiment.

FIG. 3 is a timing diagram illustrating operation according to an example embodiment. At 304, BS 104 may determine a new group for MS 106. BS may determine a new group based on load balancing between groups (e.g., attempting not to overload either group or to keep the load on each group approximately the same), availability of resources for each groups, the distance of the MS from the BS and the MCS for each group, received signal quality measured by the MS, or based on any other information or criteria, for example.

Next, at 306, the BS 104 may send a message to MS 106 that includes a group switch instruction. The group switch instruction may include a group indicator field that identifies a new group that the MS should switch to. Thus, for example, the group switch instruction may be an instruction to switch from a current group of MS 106 to a new group (e.g., identified by the group indicator field), such as an instruction to switch from group 1 to group 2 (group indicator identifying group 2), or to switch from group 2 to group 1 (group indicator identifying group 1), as examples. The group switch instruction may include a request to the MS to notify the BS whether it has received the instruction.

At 308, the MS 106 may attempt to switch to the new group. Attempting to switch to the new group may include, for example, identifying the location of the group Map for the new group and attempting (310) to decode the group Map for the new group. The group Map may typically identify locations of uplink resources and/or downlink resources for different purposes or different messages (control messages, management messages, data, etc.) and thus, decoding the group Map of the new group may allow the MS 106 to transmit messages or data to the BS and/or receive messages or data from the BS 104. If the MS 106 is unable to locate the group Map for the new group or to decode the group Map of the new group, this may, at least in some cases, prevent the MS 106 from communicating with the BS via the new group, for example. (Although, in some cases, there may be some new group resources that may be known and used by the MS, even though the MS has not switched to the new group, for example). Thus, according to an example embodiment, the MS switching to the new group may occur when the MS has decoded a group Map associated with (or for) the new group. Also, in another example embodiment, transmitting messages or data to and receiving messages or data from the BS via the new group resources may also be considered part of switching to the new group, for example.

According to an example embodiment, decoding (signal decoding) may include signal acquisition, demodulating an acquired signal, performing a forward error correction and performing a CRC (cyclic redundancy check) check for a received packet or block of data. For example, the CRC check may include calculating a CRC over a packet (or portion thereof) and comparing (e.g., XORing) the calculated CRC to an appended CRC to confirm the two CRCs match, which may confirm that the packet was received without errors, for example. Other tasks may be included within signal decoding, as this merely describes an example of some tasks that may be included within signal decoding.

At 312, an acknowledgement may be sent from the MS 106 to the BS 104 that acknowledges either the success or the failure of the attempting to switch to the new group. An acknowledgement may be sent if there is a success, and/or an acknowledgement may be sent if there is a failure. Thus, in an example embodiment, it is not necessary to send both the Ack (if success) and Nack if a failure. Only one may be used, at least in some example embodiments. Also, an acknowledgement may be sent if there is only a success, or only a failure. For example, sending operation 312 may include, for example, sending, from the MS, either a group switch acknowledgement message sent via new group resources or any other resources designated by the BS that acknowledges that the MS has switched to the new group if the attempting was successful, or a group switch negative acknowledgement message sent via current group resources or any other resources designated by the BS that indicates that the MS has not switched (and/or is unable to switch) to the new group if the attempting to switch to the new group was unsuccessful. A timer may also be used at the BS to determine whether the MS has successfully switched to the new group. For example, if a group switch acknowledgement acknowledging that the switch to the new group was successful is not received by the BS via the designated resource or within a timeout period (using the timer), this may indicate to the BS that the MS has not been able to switch to the new group.

In an example embodiment, the sending of operation 312 may include sending, from the mobile station either a data packet, a control message or a management message, or a tone or signal, via a resource allocated by the base station from either the new group, the current group or other resource allocation.

BS 104 may allocate to the MS uplink resources (e.g., resources associated with the new group, resources associated with the current group, or resources provided within a common uplink transmission area that may be used by all MSs regardless of group association), or other resource allocation, for the MS 106 to send (or transmit) to the BS 104 the group switch acknowledgement message, a group switch negative acknowledgement message, or other uplink message or packet. For example, a common UL transmission resource (or common UL transmission region) may be assigned or reserved for all MS (regardless of their group association) for the transmission of the group switch Ack message or group switch Nack message or other message or packet, for example.

Since the BS may, for example, allocate UL resources in the new group for the MS to send an group switch acknowledgement message, the BS may also allocate (or pre-allocate) an UL resource in the new group for the MS to transmit a group switch negative acknowledgement message to the BS, for example. The MS may continue attempting to decode the group Map for the new group. Even though the MS may fail to decode the group Map for the new group, the MS, at that point, may still be able to use the allocated (or pre-allocated) uplink resource in the new group (or in the common region) to transmit a group switch Nack or Ack message. The BS may communicate the location within the frame of the pre-allocated resource as part of, or even prior to, transmission of the group switch instruction, for example. In addition, if the MS sends a group switch Nack message when the Map of a new group is not successfully decoded by the MS, and if the BS uses a timer to provide a timeout when a group switch Ack message is not received within the timeout period, and the MS is instructed to continue decoding the Map of the new group and sending the group switch Nack message indicating failure of the attempted switching to the new group, then this may allow, for example, the BS to collect statistics for Map decoding, and this may allow for the BS to make adjustments to the Map's MCS (modulation and coding scheme), e.g., a high switch failure rate may indicate that a more robust MCS should be used, for example, or that the MS should associate with another group.

In another example embodiment, a timer may be used by the MS to continue decoding the MAP of a new group, sending NACK as requested by the BS, and return to the current group when the timer expires. The same timer may be used by the BS to determine when the MS returns to the current group if no ACK is received within the timer (or timeout value of the timer). The (timeout) value of a timer may be determined by the BS and communicated to the MS, may be negotiated between the MS or BS, or may be pre-set and known to both MS and BS prior to the group switch operation, as examples.

Figure 4:
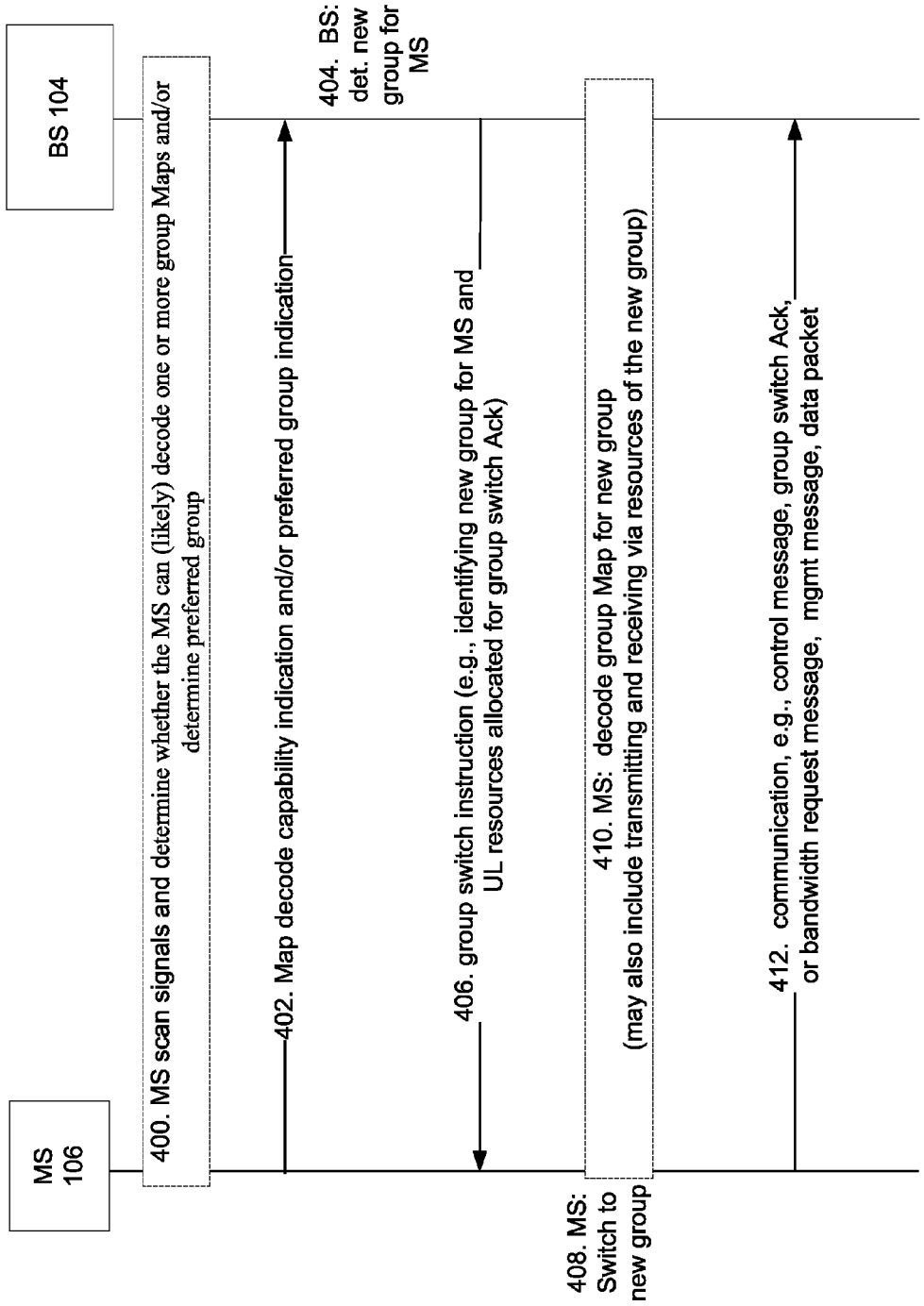
FIG. 4 is a timing diagram illustrating operation of a system according to another example embodiment.

FIG. 4 is a timing diagram illustrating operation according to an example embodiment. A MS 106 may be wirelessly coupled to BS 104, for example.

At optional operation 400, MS 106 may perform scanning, which may include, for example, receiving one or more group Maps (e.g., a group 1 Map and/or a group 2 Map) transmitted from BS 104, and determining whether the MS 106 can likely decode one or more of the group Maps transmitted by BS 104, and/or determining a preferred group. Determining whether the MS can likely decode one or more of the group Maps may include, for example, decoding or attempting to decode a group Map, measuring signal quality or signal strength of received signals or group Maps, or measuring signal statistics related to the received group Maps, or other processing.

A different modulation rate and coding scheme (MCS) may be used by a BS to transmit different group Maps. For example, BS 104 may transmit a group 1 Map, e.g., directed to MSs located relatively far away from the BS, using a first MCS that is relatively robust, and may transmit a group 2 Map, e.g., directed to MSs that may be closer, using a second MCS that is less robust (to provide greater transmission efficiency) than the MCS used for group 1 Map. Thus, group 1 may be considered a more reliable group (or a reliable group), since BS 104 may transmit the group 1 Map using a more reliable or more robust MCS, as compared to the group 2 MCS, as an example. Thus, for example, a MS may, at least in some cases, be able to decode some group Maps, but may be unable to decode other group Maps. For example, a MS 106 may be able to decode a first group Map (e.g., due to a more robust MCS), but may be unable to decode a second group Map (e.g., due to a more challenging MCS), in this example. Of course, in an alternative embodiment, group 2 may be provided as a more reliable or more robust group.

Each group Map may identify UL and DL resources, such as ranging resources for the group (that allow a MS to perform ranging with the BS as a member of that group). Thus, if a MS is unable to decode a group Map, the MS may typically (at least in some cases) be unable to obtain the ranging resources, and will typically be unable to perform ranging with that group, and will not know locations of UL and DL resources, etc. Thus, a MS may typically be unable to join or register as a member of a group with a BS if the MS is unable to decode the group Map for that group, according to an example embodiment.

In an example embodiment, at 400, the MS 106 may scan and determine whether the MS is capable of decoding one or more group Maps (e.g., group 1 Map and/or group 2 Map) transmitted by BS 104. Although two group Maps are described in this example, any number of groups (and group Maps) may be used, e.g., two groups, three group, four groups, etc. Within the plurality of group Maps, there may be one of the group Maps (e.g., group 1 Map) that may be the reliable or most robust group, since the group Map for such reliable group may be transmitted using a more robust MCS, e.g., as compared to other groups.

To determine whether or not the MS is capable of decoding one or more group Maps, the MS may measure one or more signals from BS 104, or measure statistics related to signals received from BS 104, attempt to decode one or more group Maps, etc. In an example embodiment, the MS 106 may determine whether or not it can decode a group Map(s) from BS 104 by, for example, performing one or more of the following: acquiring a signal from the BS; demodulating an acquired signal from the BS; performing a forward error correction; performing a CRC (cyclic redundancy check) check on a packet received from the BS; measuring a channel quality of a signal received from a BS; or, measuring a channel quality of one or more group Maps received from a BS.

For example, a MS may determine (or estimate) that it cannot (or will be unlikely to) decode a Map if the signal quality (e.g., received signal strength or RSSI or SINR) from BS 104 is below a threshold, such as for a received group 1 Map or a group 2 Map, or if the MS is unable to demodulate a packet or group Map from a BS, or a CRC check on a packet indicates an error, as examples.

In one example embodiment, the MS may determine (or may estimate) that it is capable of decoding (or likely capable of decoding) one or group Maps from BS 104, e.g., if received signal strength or other channel quality indication indicates a strong signal for a received group Map, or is able to demodulate the group Map, or a portion thereof, or if the CRC check indicates no errors in a received signal or in a receive group Map from the candidate BS, etc. These are merely some examples of how a MS may determine that it is capable of decoding a group Map. Thus, because signal conditions are dynamic and may vary over time, and because this analysis may not necessarily fully decode a group Map, this analysis may only indicate decode capabilities in terms of probabilities or likelihoods, e.g., that the MS will likely be capable (or is likely incapable) of decoding a particular group Map, according to an example embodiment.

The MS 106, for example, may also determine a preferred group with respect to BS 104. The preferred group may, for example, be the group corresponding to the only group Map from BS 104 that the MS can decode, or in the event the MS can decode both (or multiple) group Maps, the MS may select one of the two (or multiple) available groups as a preferred group to join, e.g., based on other criteria or metric or measurement, for example.

Referring to FIG. 4 again, after determining whether the MS is capable (e.g., likely capable) of decoding one or more group Maps transmitted from BS 104, at 402, the MS 106 may send to BS 104 a report or message, which may, for example, identify a preferred group (or group preference information) for BS 104, such as a preferred group indication (PGI), which may be based on which group Maps the MS 106 can decode or other information. Alternatively, MS 106 may send BS 104 Map decode capability information indicating whether or not MS 106 can decode one or more group Maps, such as a Map decode capability indication (Map DCI) for each of the one or more group Maps (e.g., for group 1 Map and/or group 2 Map) transmitted by BS 104. Thus, the Map DCI may indicate which, if any, of the group Maps transmitted by BS 104, the MS 106 is capable of decoding.

The MAP DCI may, for example, be in a form of a single value (or multiple values) indicating MAP decode ability, a time-series of MAP decode ability values, statistics of MAP decode ability or other information or format that aids the BS in determining the MS's ability to decode each MAP. A BS may use collective MAP DCIs from various MS(s) to determine an appropriate MCS for each MAP, for example. The Map DCI may be, for example, a bit map indicating 0 or 1 for each group Map (0 for likely cannot decode group Map, and 1 indicating likely can decode group Map). Each DCI value may provide a value within a range (e.g., 0 to 2) that indicates a highest decode capability for a group Map (e.g., signal acquisition, demodulation, or CRC check performed successfully). The Map DCIs may, in an example embodiment, simply provide signal quality information or signal statistics, such as identifying a received signal strength (RSSI) or SINR of a signal received from a candidate BS, and may even be a group Map specific channel quality indication (e.g., RSSI of a particular group Map), may be a value within a range that indicates a likelihood of being able to decode a group Map, or other value which may be used by the BS to assign or determine a group assignment for the MS (or to determine a suitable or suggested group assignment). As noted, operations 400 and 402 are optional, and thus, may be omitted by the MS 106.

Next, at 404, BS 104 may determine a new group for MS 106. BS may determine a new group based, for example, on load balancing between groups (e.g., attempting not to overload either group or to keep the load on each group approximately the same), availability of resources for each groups, the distance of the MS from the BS and the MCS for each group (e.g., may assign group 2 for nearby MSs, and may assign group 1 that uses a more robust MCS to MSs that are farther away from the BS), received signal quality measured by the MS, based on a PGI and/or Map DCI or other information provided by MS 106, or based on any other information or criteria.

Next, at 406, the BS 104 may send a message to MS 106 that includes a group switch instruction. The group switch instruction may include a group indicator field that identifies a new group that the MS should switch to. Thus, for example, the group switch instruction may be an instruction to switch from a current group of MS 106 to a new group (e.g., the new group identified by the group indicator field), such as an instruction to switch from group 1 to group 2 (group indicator identifying group 2), or to switch from group 2 to group 1 (group indicator identifying group 1), as examples.

At 406, the BS may also request (provided within a same or different message as the group switch instruction) that the MS 106 send back to the BS 104 a group switch acknowledgement message that acknowledges that the MS 106 has switched (successfully) to the new group. A group switch ACK field, for example, may be provided within the message at 406 to indicate that the MS 106 should explicitly acknowledge switching to the new group, e.g., by sending a group switch acknowledgement to BS 104. BS 104 may also allocate to the MS uplink resources (e.g., associated with the new group, associated with the current group, or provided within a common transmission area that may be used by all MSs regardless of group association), for the MS 106 to send (or transmit) to the BS 104 the group switch acknowledgement message or other uplink message or packet. The uplink resource allocation may be communicated to the MS 106 within the same message or a different message as the group switch instruction. After the MS 106 has switched to the new group, the MS may then communicate with (e.g., send/transmit to and/or receive from) the BS 104 via the new group resources (e.g., either via group 1 OFDM symbols/subcarriers or group 2 OFDM symbols/subcarriers). Thus, the resource allocation for the group switch acknowledgement message may be provided within the resources (e.g., OFDM symbols and/or subcarriers) associated with the new group.

Also, according to an example embodiment, the BS 104 may continue to allocate current group uplink and/or downlink resources to the MS 106 for a period of time after sending the group switch instruction (e.g., until expiration of a timer started upon sending group switch instruction at 406), which may include uplink resources of the current group to allow the MS 106 to communicate to BS 104 via current group resources until the MS has switched to the new group. Alternatively, the BS 104 may continue to allocate UL resources and/or DL resources of the current group to MS 106 until the BS 104 receives a group switch acknowledgement from the MS or other packet that may acknowledge, either explicitly (such as a group switch acknowledgement) or implicitly (e.g., by the MS sending data or bandwidth request via the new group resources), that the MS has switched to the new group At 408, the MS 106 may switch to the new group. Switching to the new group may include, for example, (successfully) decoding (410) the group Map for the new group. The group Map may typically identify location of uplink resources and/or downlink resources for different purposes or different messages (control messages, management messages, data, etc.), and thus, decoding the group Map of the new group may allow the MS 106 to transmit messages or data to the BS and/or receive messages or data from the BS 104. If the MS 106 is unable to decode the group Map of the new group, this may prevent the MS 106 from communicating with the BS via the second group, for example. Thus, according to an example embodiment, the MS switching to the new group may occur when the MS has decoded a group Map associated with (or for) the new group. Also, although not required, in another example embodiment, transmitting data to and receiving data from the BS 104 via the new group resources may also be considered part of switching to the new group, for example.

At 412, a communication may be sent from the MS 106 to the BS 104 via uplink resources associated with the new group. Alternatively, the communication that indicates that the mobile station has switched to the new group may be sent via a resource allocated by the base station, such as a current group resource, a new group resource, a common resource that may be used by mobile stations regardless of group association, or other allocated resource. The communication that indicates that the mobile station has switched may include, as examples, a group switch acknowledgement message, a control message, a management message, a bandwidth request message requesting zero or more resources, a data packet, or a tone or signal.

According to an example embodiment, a receipt of the communication (at 412) by the BS that was transmitted by the MS via resources associated with the new group or any other resources designated (such as current group resources, or resources shared by multiple groups or resources shared by current group and new group) by the BS may indicate (e.g., to the BS), either explicitly or implicitly, that the MS has switched to the new group. For example, the MS 106 may decode a group Map for the new group, and then based on the group Map, may obtain resources of the new group that have been allocated to the MS for uplink transmission, and then the MS 106 may transmit the communication (at 412) to the BS 104 via the allocated uplink resource. Thus, in an example embodiment, the fact the MS 106 can transmit data (data packet), a control or management message or other signal, via an allocated resource of the new group or any other resources designated by the BS may indicate to the BS 104 that the MS was able to decode the group Map for the new group, which may, at least implicitly, indicate that the MS 106 has switched from the current (or old) group to the new group, according to an example embodiment.

Likewise, the MS 106 may be able to obtain the resource that may have been allocated for transmission of a control message or management message by decoding the group Map for the new group. Thus, the transmission by the MS 106 to the BS 104 (and receipt by the BS 104) of a control message or management message via a new group resource or any other group designated by the BS may indicate to the BS 104 that the MS 106 has switched to the new group.

For example, the MS 106 may obtain, by decoding a group Map of the new group, a resource allocation of the new group resources for transmission of an uplink control message, such as, for example, a bandwidth request message. The MS 106 may, thus, transmit a bandwidth request message to the BS 104, via resources for the new group or any other resources designated by the BS, for zero or more resources (or a request for zero bandwidth) of the new group resources. For example, a zero resource (or zero bandwidth) request message may be sent by a MS 106 that has switched to a new group and currently has no data or packets to send to the BS 104. Such a bandwidth request may, for example, indicate to the BS 104 that the MS 106 has switched to the new group, without requiring a new type of message. Likewise, MS 106 may send a bandwidth request with a non-zero resource (or bandwidth) request, which may both indicate that the MS has switched to the new group and request new group resources or bandwidth for transmission of packets to the BS 104. In another example, a one-time CQICH (channel quality indicator channel) may be assigned to the MS 106 by the BS 104 so that the MS may indicate to the BS that the MS has switched to the new group. Other types of messages may be used as well to indicate to the BS 104 that the MS 106 has switched to the new group.

In addition, a specific-purpose MAC (Media Access Control) message may be sent by the MS 106 to the BS 104 to specifically or explicitly acknowledge that the MS 106 has switched to the new group. For example, a group switch acknowledgement message may be sent (as message 412 in FIG. 4) to explicitly acknowledge to BS 104 that the MS 106 has switched to the new group (e.g., acknowledging that the MS 106 was able to decode the group Map for the new group, as an example).

Figure 5:
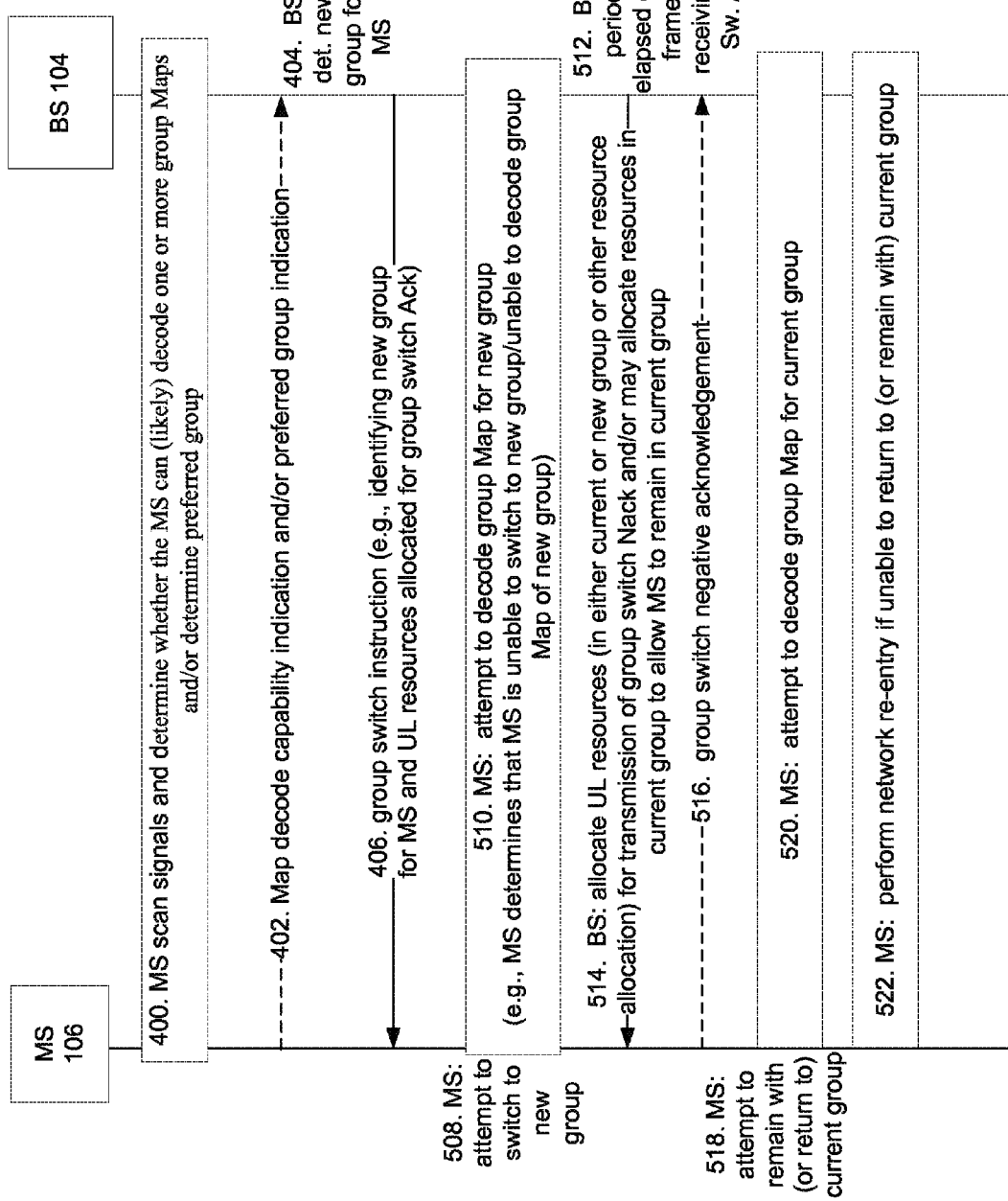
FIG. 5 is a timing diagram illustrating operation of a system according to yet another example embodiment.

FIG. 5 is a timing diagram illustrating operation according to another example embodiment. Operations 400, 402, 404 and 406 may be the same or similar to those same operations illustrated in and described with respect to FIG. 4.

At 508, the MS attempts to switch to the new group, which may include attempting (510) to decode a group Map for the new group. As noted above, different MCS may be used for different group Maps. Thus, a MS may be able to decode a group Map (e.g., a group 1 Map) from a BS 104, but may be unable to decode a different group Map (e.g., group 2 Map, which may use a more challenging or less robust MCS as compared to group 1 Map) from the same BS 106.

At 512, after a time period (e.g., after a specific number of frames) has elapsed or occurred since sending (406) the group switch instruction without receiving a group switch acknowledgement, or upon receiving a group switch negative acknowledgement (516) sent from the MS 106 to the BS 104, the BS 104 may allocate UL resources in the current group or new group for the MS 106 to transmit the group switch negative acknowledgement (Nack) to the BS 104. The BS 104 may also instruct the MS 106 to remain in the current group (e.g., to continue with communication via the current group). The current group may be used to transmit the group switch Nack, e.g., since the MS did not switch to the new group and may still be in the current group. Alternatively, the Nack may be transmitted via the new group, since the MS may still be able to transmit via an allocated resource of the new resource, even though the MS was unable to decode the group Map for the new group, for example. Any other resources designated by the BS such as a common (e.g., common resource that may be accessible by MSs of multiple groups or even all groups, or even MSs that have not joined a group) uplink transmit region may also be used to transmit the group switch Nack. Thus, the BS may allocate uplink resources for transmission of a group switch Nack, such as from the new group, the current group, a common resource or region that may be accessible to mobile station regardless of group association, or any other resource allocated by the BS, as examples.

In addition, or in the alternative, at 514, after failing to receive the group switch acknowledgement, or after receiving the group switch Nack from the MS, the BS 104 may allocate UL resources in the current group to the MS 106 to allow the MS 106 to remain in the current group.

If after a specific time period or a specific number of frames, the MS may return to (or remain with) the current group (518), e.g., by attempting (520) to decode the group Map for the current group. If the MS 106 is unable to return to (or remain with) the current group, e.g., unable to decode the group Map for the current group, the MS 106 may perform network re-entry (522).

As noted above, in an example embodiment, group 1 may be a reliable group, e.g., in which a more robust MCS may be used to transmit the group 1 Map (as compared to group 2 Map), and/or with a well-known location of the group 1 Map. In the case of an instruction to switch from group 1 to group 2, it is possible that the MS 106 may be unable to decode group 2 Map. If the MS' attempt to switch to group 2 is unsuccessful (e.g., after unsuccessfully attempting to decode group 2 Map), the MS 106 may then return (or switch back) to group 1, by attempting to decode group 1 Map. The MS may then obtain a group boundary information from the group 1 Map. The MS may then use the group boundary information (e.g., identifying a location of the group 2 Map or the group 2 DL sub-frame) to then decode the group 2 Map. For example, the BS may have changed the group boundary (e.g., location of the group 2 Map), thus it may be necessary for the MS to first decode the group 1 Map to obtain the new or updated group boundary information before switching to group 2, according to an example embodiment. If the MS is unsuccessful in attempting to switch back to group 1 (e.g., the MS is unable to decode group 1 Map), the MS may then perform network re-entry. For example, the MS may include a timer or a frame counter. In an example embodiment, the MS may perform network re-entry if the MS is unable to decode the group 1 Map for a specific number of frames or for a specific period of time.

On the other hand, for example, in the case of an instruction for the MS to switch from group 2 to group 1, if the MS is unable to decode a group 1 Map (as part of attempting to switch to group 1), e.g., for a specific number of frames or for a specific period of time, the MS may perform network re-entry, for example. Thus, if the MS is unable to decode group 1 Map, it may be doubtful, for example, that the MS can decode the Group 2 Map, since, for example, the group 1 Map may be transmitted (for example as the reliable group) using a more robust MCS as compared to the group 2 Map. Thus, it may be unnecessary in this example for the MS to switch back to the group 2 (attempt to decode group Map of the non-reliable group) if the MS was unable to decode the group 1 Map (group Map of the reliable group), since the MCS for group 2 Map may be more challenging (less robust) than then MCS used for the group 1 (e.g., reliable group) Map, for example.

The various operations of sending, receiving, determining, attempting to switch, switching, and the like, may be performed by the wireless transceiver 1302 operating with (or under control of) controller 1304 (see FIG. 13), according to an example embodiment. For example sending (or transmitting) may involve the wireless transmitter sending or transmitting a specific message, under control of controller 1304. Switching to a new group (or attempting to switch) may involve wireless transceiver 1302, e.g., under control of controller 1304, receiving packets or other signals associated with wireless media resources (e.g., OFDM symbols, subcarriers, . . . ) for the new group (such as for the group Map of the new group), where each group may use a different set of resources (e.g., different subcarriers or frequencies, or different symbols). Other operations, such as allocating resources, various determining operations, etc. may be performed by controller 1304, for example.

Figure 6:
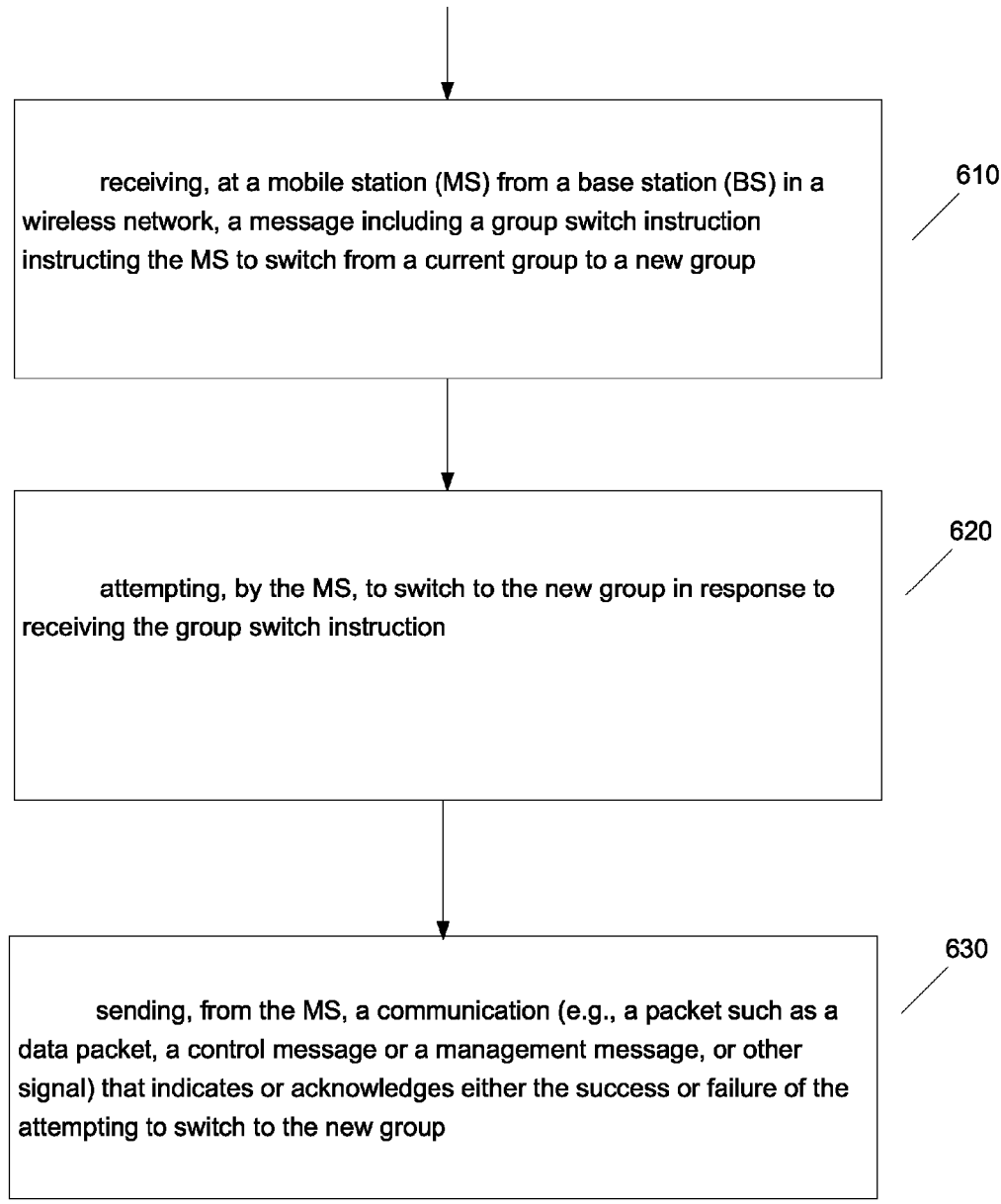
FIG. 6 is a flow chart illustrating operation of a wireless node according to an example embodiment.

FIG. 6 is a flow chart illustrating operation of a wireless node according to an example embodiment. Operation 610 may include receiving (e.g., by wireless transceiver 1302), at a mobile station (MS) from a base station (BS) in a wireless network, a message including a group switch instruction instructing the MS to switch from a current group to a new group. Operation 620 may include attempting (e.g., by wireless transceiver 1302 and controller 1304), by the MS, to switch to the new group in response to receiving the group switch instruction. Operation 630 may include sending (e.g., by wireless transceiver 1302), from the MS, an acknowledgement message that acknowledges either the success or failure of the attempting to switch to the new group.

In an example embodiment, operation 630 may include sending (e.g., by wireless transceiver 1302), from the MS, either a group switch acknowledgement message sent via new group resources or any other resources designated by the BS that acknowledges that the MS has switched to the new group if the MS attempting to switch to the new group was successful, or a group switch negative acknowledgement message sent via current group resources or any other resources designated by the BS that indicates that the MS has not switched to the new group if the MS attempting to switch to the new group was unsuccessful. In another example embodiment, the sending operation 630 may include sending, from the mobile station (MS), either a data packet, a control message or a management message, via a resource allocated by the base station from either the new group, the current group or other resource allocation. In another example embodiment, operation 620 may include attempting to decode a group Map of the new group.

According to an example embodiment, an apparatus may include a controller (e.g., controller 1304) and a wireless transmitter and receiver (e.g., wireless transceiver 1302). In an example embodiment, the wireless receiver, under control of the controller 1304, may be configured to receive, at a mobile station (MS) from a base station (BS) in a wireless network, a message including a group switch instruction instructing the MS to switch from a current group to a new group. The controller 1304 and the wireless receiver may be configured to attempt, by the MS, to switch to the new group in response to receiving the group switch instruction. Also, the wireless transmitter, under control of the controller 1304, may be configured to send, from the MS, an acknowledgement message that acknowledges either the success or failure of the attempting to switch to the new group.

Figure 7:
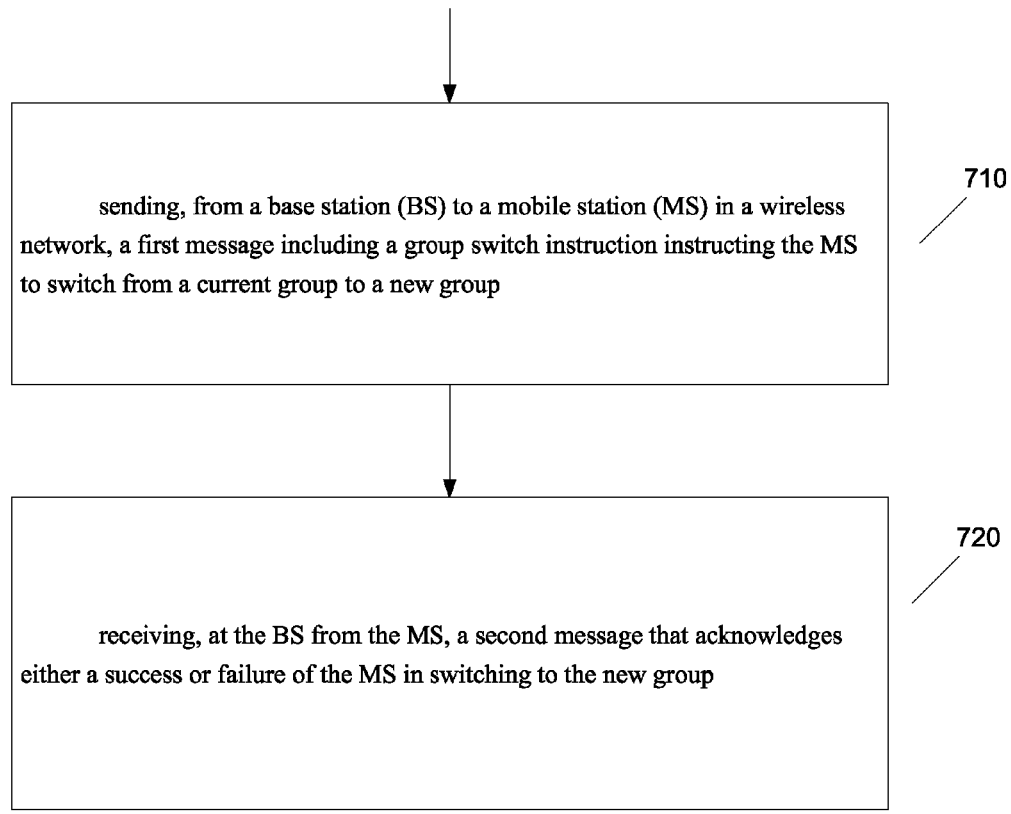
FIG. 7 is a flow chart illustrating operation of a wireless node according to another example embodiment.

FIG. 7 is a flow chart illustrating operation of a wireless node according to an example embodiment. Operation 710 may include sending (e.g., by wireless transceiver 1302), from a base station (BS) to a mobile station (MS) in a wireless network, a first message including a group switch instruction instructing the MS to switch from a current group to a new group. Operation 720 may include receiving (e.g., by wireless transceiver 1302), at the BS from the MS, an second message that acknowledges either a success or failure of the MS in switching to the new group.

In an example embodiment, the second message may include, for example, a data packet, control message or management message or other signal that indicates (or acknowledges) either a success or failure of the mobile station in switching to the new group. For example, the second message may be sent via a resource of the new group, the current group, or a common resource or region that may be available for use by mobile stations regardless of group association, or other resource allocated by the base station. In an example embodiment, receiving the second message may include, for example, receiving either a group switch acknowledgement that acknowledges that the mobile station has switched to the new group, or a group switch negative acknowledgement message that indicates that the mobile station has not switched and/or is unable to switch to the new group.

According to an example embodiment, the receiving operation 720 may include receiving (e.g., by wireless transceiver 1302), at the BS, either a group switch acknowledgement message that acknowledges that the MS has switched to the new group or a group switch negative acknowledgement message that indicates that the MS has not switched to the new group.

According to an example embodiment, the flow chart of FIG. 7 may further include performing the following prior to the sending: receiving (e.g., by wireless transceiver 1302), at the BS from the MS, a Map decode capability indication (Map DCI) or preferred group indication (PGI); and determining (e.g., by controller 1304), by the BS, the new group for the MS based on at least the Map DCI and/or the PGI received from the MS.

According to an example embodiment, the flow chart of FIG. 7 may further include, after expiration of a period of time since the sending the first message without receiving the second message (or a group switch acknowledgement message) at the BS from the MS, or upon receiving a group switch negative acknowledgement message: sending (e.g., by wireless transceiver 1302), from the BS to the MS, a third message including a second group switch instruction instructing the MS to switch to, or remain with, the current group. Alternatively, the BS may simply assume that the MS remains in the current group, if the switch to the new group was unsuccessful, without sending an instruction for the MS to remain in the current group, and the MS may, for example, continue to remain in the current group if the switch to the new group was unsuccessful according to another example embodiment.

According to an example embodiment, an apparatus may include a controller (e.g., controller 1304), and a wireless transmitter and receiver (e.g., 1302). The wireless transmitter, under control of the controller 1304, may be configured to send, from a base station (BS) to a mobile station (MS) in a wireless network, a message including a group switch instruction instructing the MS to switch from a current group to a new group. Also, the wireless receiver, under control of the controller 1304, may be configured to receive, at the BS from the MS, an acknowledgement message that acknowledges either a success or failure of the MS in switching to the new group.

Figure 8:
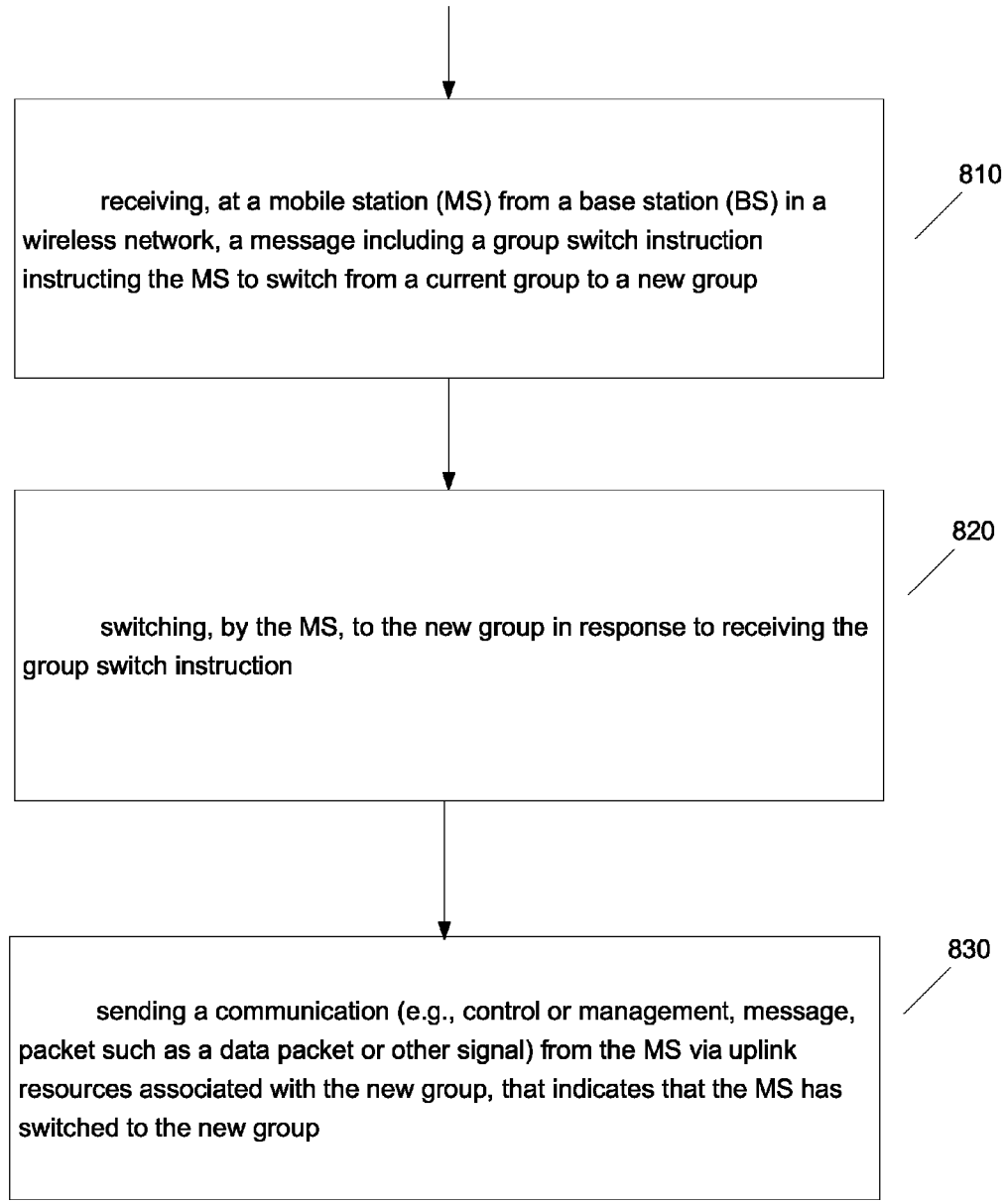
FIG. 8 is a flow chart illustrating operation of a wireless node according to another example embodiment.

FIG. 8 is a flow chart illustrating operation of a wireless node according to an example embodiment. Operation 810 may include receiving (e.g., by transceiver 1302), at a mobile station (MS) from a base station (BS) in a wireless network, a message including a group switch instruction instructing the MS to switch from a current group to a new group. Operation 820 may include switching (e.g., by controller 1304 and transceiver 1302), by the MS, to the new group in response to receiving the group switch instruction. And, operation 830 may include sending (e.g., by transceiver 1302) a communication (e.g., control or management, message, packet such as a data packet or other signal), from the MS via uplink resources associated with the new group or any other resources designated by the BS, that indicates that the MS has switched to the new group.

In the flow chart of FIG. 8, receipt of the packet by the BS may indicate to the BS (base station), either implicitly or explicitly, that the MS has switched to the new group. In an example embodiment, the sending operation 830 may include sending a packet from the MS to the BS via uplink resources associated with the new group, the current group or other resource allocated by the BS, the packet including one of: a group switch acknowledgement message that acknowledges that the MS has switched to the new group; a control message; a management message; a bandwidth request message requesting zero or more resources; or a data packet, or a tone or other signal.

In an example embodiment, receiving operation 810 may include receiving (e.g., by transceiver 1302), at a mobile station (MS) from a base station (BS) in a wireless network, a message including a group switch instruction instructing the MS to switch from a current group to a new group, the message also requesting a group switch acknowledgement from the MS that acknowledges that the MS has switched from the current group to the new group, the message also identifying an uplink resource associated with the new group for the MS to send the requested group switch acknowledgement. An uplink resource associated with the new group for the MS to send the requested group switch acknowledgement may be allocated prior to a group switch instruction via another management message sent by the BS, for example.

In an example embodiment, the switching operation 820 may include decoding (e.g., by controller 1304 and transceiver 1302) a group Map of the new group.

In an example embodiment, the switching operation 820 may include: decoding (e.g., by controller 1304 and transceiver 1302) a group Map of the new group; and receiving (e.g., by transceiver 1302) data from the BS via downlink resources of the new group, and/or transmitting data to the BS via uplink resources of the new group.

In an example embodiment, the sending operation 830 may include obtaining (e.g., by controller 1304 and transceiver 1302) by the MS from the BS, an uplink resource associated with the new group, and sending, from the MS to the BS via the uplink resource, a group switch acknowledgement message that acknowledges that the MS has switched to the new group.

In an example embodiment, the sending operation 830 may include obtaining, either via contention or by receiving an allocated resource, an uplink resource associated with the new group, and sending, from the MS to the BS via the uplink resource, a bandwidth request message with a request for zero or more resources to acknowledge that the MS has switched to the new group.

The flow chart of FIG. 8 may further include performing the following prior to receiving the group switch instruction: determining (by controller 1304), by the MS, whether or not the MS can likely decode a group Map associated with the new group from the BS, and sending, from the MS to the BS, a Map decode capability indication (Map DCI) indicating whether or not the MS can likely decode the group Map associated with the new group.

The flow chart of FIG. 8 may further include performing the following prior to receiving the group switch instruction: receiving, at the MS from the BS, group signals associated with the current group and group signals associated with the new group, determining (by controller 1304) a preferred group based on the received signals, and sending (by transceiver 1302) a message from the MS to the BS including a preferred group indication (PGI) that indicates a group that is preferred by the MS.

Figure 9:
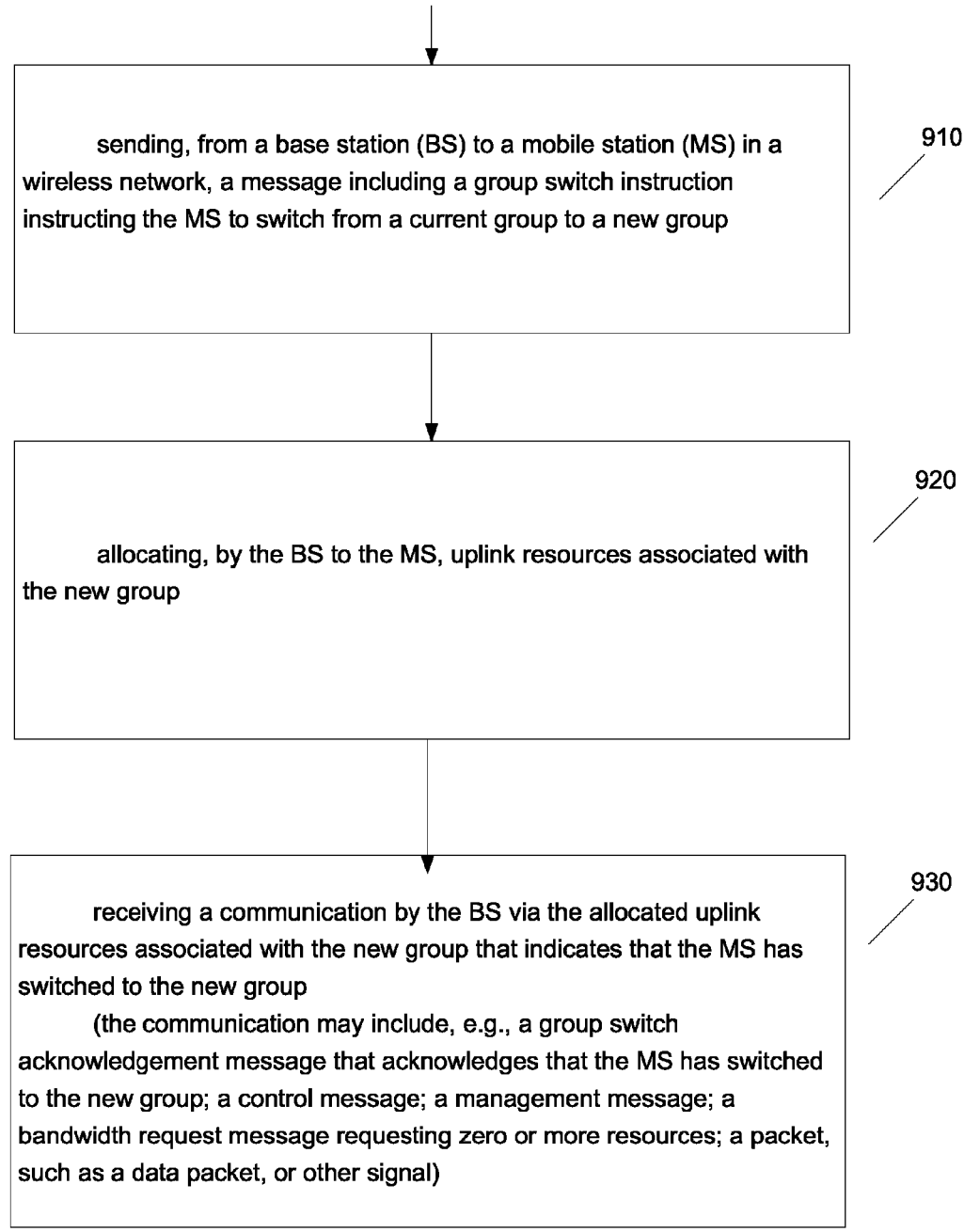
FIG. 9 is a flow chart illustrating operation of a wireless node according to another example embodiment.

FIG. 9 is a flow chart illustrating operation of a wireless node according to an example embodiment. Operation 910 may include sending (e.g., by transceiver 1302), from a base station (BS) to a mobile station (MS) in a wireless network, a message including a group switch instruction instructing the MS to switch from a current group to a new group. Operation 920 may include allocating (e.g., by controller 1304), by the BS to the MS, uplink resources associated with the new group. Operation 930 may include receiving (e.g., by transceiver 1302) a packet by the BS via the allocated uplink resources associated with either the new group, current group other resource allocation, that indicates that the MS has switched to the new group.

In the flow chart of FIG. 9, according to an example embodiment, the receiving of the packet by the BS may indicate to the BS, either implicitly or explicitly, that the MS has switched to the new group.

In the flow chart of FIG. 9, the receiving operation 930 may include receiving, a communication at the BS from the MS via the allocated uplink resources, the communication including one of: a group switch acknowledgement message that acknowledges that the MS has switched to the new group; a control message; a management message; a bandwidth request message requesting zero or more resources; a packet, such as a data packet, or other signal.

The flow chart of FIG. 9 may further include receiving, at the BS from the MS, a group instruction acknowledgement that acknowledges receipt by the MS of the group switch instruction.

Figure 10:
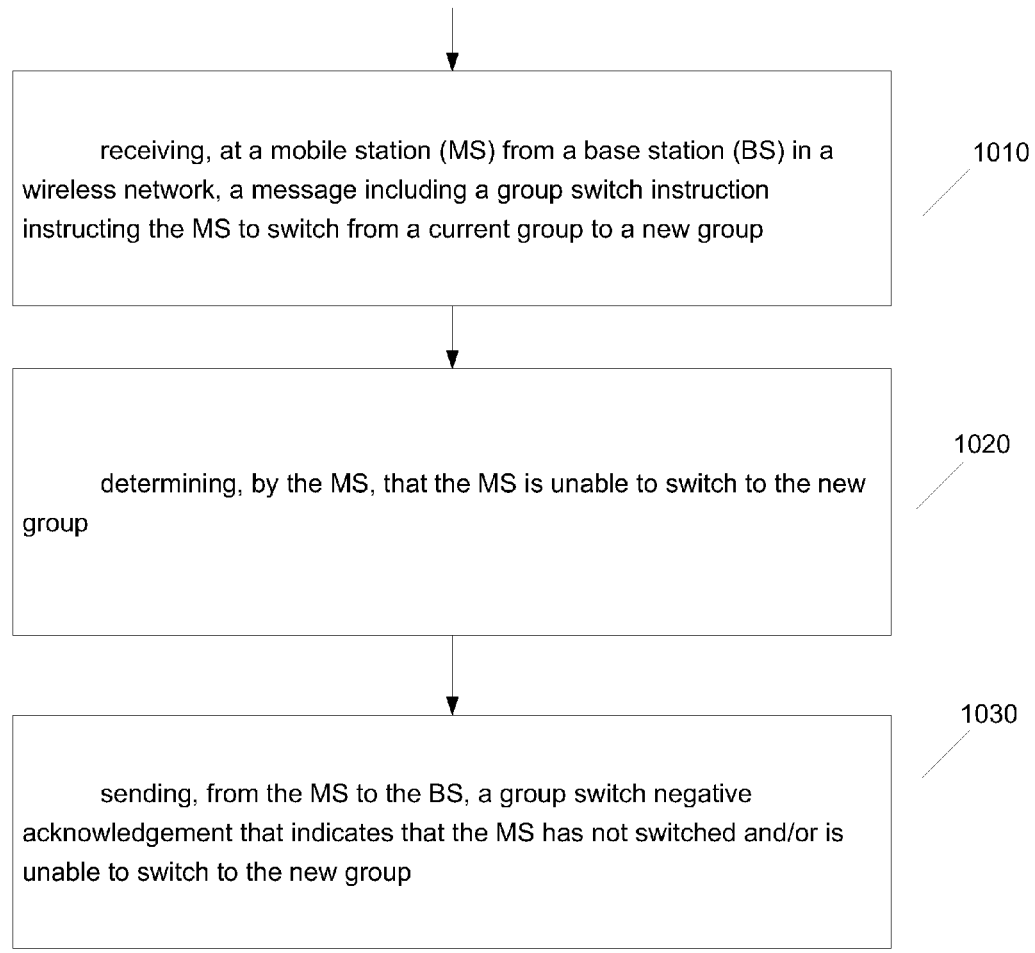
FIG. 10 is a flow chart illustrating operation of a wireless node according to another example embodiment.

FIG. 10 is a flow chart illustrating operation of a wireless node according to another example embodiment. Operation 1010 may include receiving (e.g., by transceiver 1302), at a mobile station (MS) from a base station (BS) in a wireless network, a message including a group switch instruction instructing the MS to switch from a current group to a new group. Operation 1020 may include determining (e.g., by controller 1304), by the MS, that the MS is unable to switch to the new group. Operation 1030 may include sending (e.g., by transceiver 1302), from the MS to the BS, a group switch negative acknowledgement that indicates that the MS has not switched and/or is unable to switch to the new group.

In an example embodiment, the determining operation 1020 may include unsuccessfully attempting to decode, one or more times, a group Map associated with the new group.

In an example embodiment, the sending operation 1030 may include, sending the group switch negative acknowledgement message to the BS after the MS is unable to decode a group Map associated with the new group for a time period or a number of frames.

Figure 11:
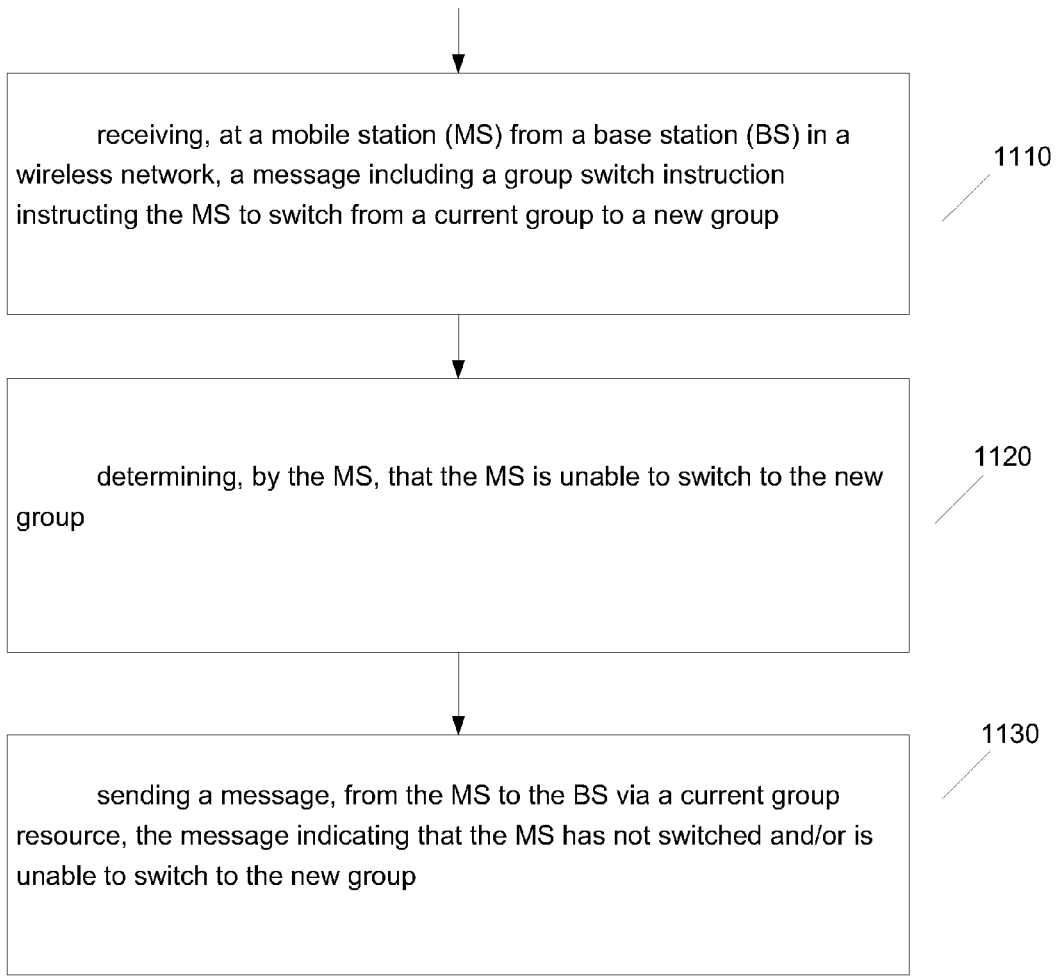
FIG. 11 is a flow chart illustrating operation of a wireless node according to another example embodiment.

FIG. 11 is a flow chart illustrating operation of a wireless node according to another example embodiment. Operation 1110 may include receiving (e.g., by transceiver 1302) at a mobile station (MS) from a base station (BS) in a wireless network, a message including a group switch instruction instructing the MS to switch from a current group to a new group. Operation 1120 may include determining (e.g., by controller 1304), by the MS, that the MS is unable to switch to the new group. Operation 1130 may include sending (e.g., by transceiver) a message, from the MS to the BS via a current group resource or any other resource (e.g., such as a common transmit resource that may be known to the MS or provided to the MS) designated by the BS, the message indicating that the MS has not switched and/or is unable to switch to the new group.

According to an example embodiment, the sending operation 1130 may include sending, from the MS to the BS via a current group resource or any other resources designated by the BS, a group switch negative acknowledgement (Nack) message that indicates that the MS has not switched and/or is unable to switch to the new group.

According to an example embodiment, the determining operation 1120 may include unsuccessfully attempting to decode a group Map associated with the new group.

The flow chart of FIG. 11 may further include remaining with or returning to the current group.

The flow chart of FIG. 11 may further include returning, by the MS, to the current group, including decoding the group Map associated with the current group, if the MS is able to decode the group Map of the current group; otherwise, after being unable to decode the group Map of the current group for a period of time, the MS performing network re-entry with the BS.

The flow chart of FIG. 11 may further include returning, by the MS, to the current group, including decoding the group Map associated with the current group and obtaining a group boundary information from the group Map of the current group, and switching to the new group, including decoding a group Map associated with the new group based on the group boundary information.

According to an example embodiment, multiple groups may be provided (e.g., two groups, three groups, four groups . . . ), and one of the groups may be designated as the reliable group, such as group 1 (although any group may be selected or used as the reliable group). A group Map for the reliable group may, for example, be transmitted with a more robust MCS (and may use the most robust MCS) which may be fixed and known to all MSs. And, the group Map (provided in the DL sub-frame for the group) or the start of the DL sub-frame for the reliable group may be provided at a fixed or known location within the frame, such as either as the first group in the frame immediately after the preamble of the frame (e.g., group 1 in FIG. 2), or at a known location or a fixed distance from a reference point within the frame, such as a fixed distance from the start of the frame or from the preamble (e.g., 20 OFDM symbols from end of Preamble), immediately after the preamble, as examples. Thus, the group Map of the reliable group may be transmitted using a fixed or known (and relatively robust) MCS, and may be provided at a fixed or known location, for example. In this manner, if a MS loses synchronization (e.g., the MS no longer has current group boundary information that identifies the location within a frame of the DL sub-frames or group Maps for the non-reliable groups), the MS may be able to identify the location of the group Map of the reliable group (e.g., due to its fixed or known location) and may have the best opportunity (or highest probability) to decode the group Map of the reliable group, e.g., due to use of a known and more robust MCS for the group Map of the reliable group, as compared to a variable or selectable MCS for other (non-reliable) group Maps which may be more challenging to decode.

Figure 12:
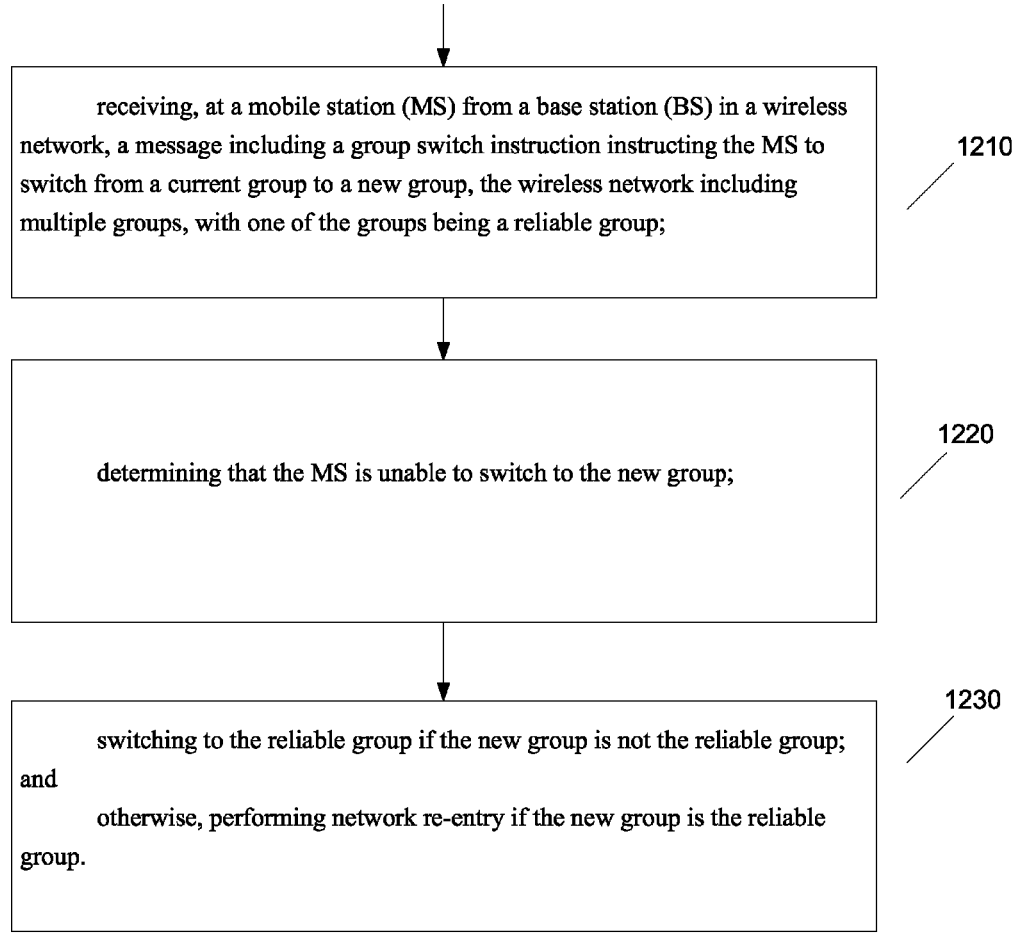
FIG. 12 is a flow chart illustrating operation of a wireless node according to yet another example embodiment.

FIG. 12 is a flow chart illustrating operation of a wireless node according to another example embodiment. Operation 1210 may include receiving (e.g., by transceiver 1302), at a mobile station (MS) from a base station (BS) in a wireless network, a message including a group switch instruction instructing the MS to switch from a current group to a new group, the wireless network including multiple groups, with one of the groups being a reliable group. Operation 1220 may include determining (e.g., by controller 1304) that the MS is unable to switch to the new group. Operation 1230 may include switching (e.g., by controller 1304 and transceiver 1302) to the reliable group if the new group is not the reliable group, otherwise, performing network re-entry if the new group is the reliable group.

In the flow chart of FIG. 12, the reliable group may include one or more of the following characteristics: a group Map of the reliable group is transmitted using a modulation and coding scheme (MCS) that is the most robust within a range of available MCS for group Maps; the group Map and/or downlink sub-frame of the reliable group is provided in a frame immediately following a frame preamble; or the group Map and/or downlink sub-frame of the reliable group is provided at a fixed or know location within the frame.

Figure 13:
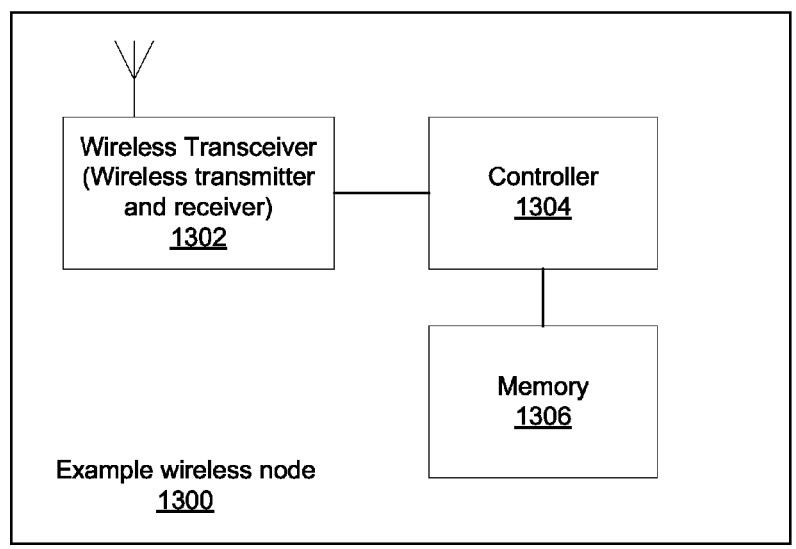
FIG. 13 is a block diagram of a wireless node according to an example embodiment.

FIG. 13 is a block diagram of a wireless station (or wireless node) 1300 according to an example embodiment. The wireless station 1300 (e.g., base station 104 or mobile station 106) may include, for example, a wireless transceiver (or wireless interface) 1302, including a wireless transmitter to transmit signals and a wireless receiver to receive signals, a controller (or processor) 1304 to control operation of the station and execute instructions or software, to control operation of the wireless transceiver 1302, and a memory 1306 to store data and/or instructions. For example, the wireless transceiver 1302 may be provided as a wireless chipset, which may include a MAC and/or PHY. Controller 1304 may also make decisions or determinations, generate frames or messages for transmission, decode received frames or messages for further processing, and other tasks or functions described herein. Controller 1304 may be programmable and capable of executing software or other instructions stored in memory or on other computer media to perform the various tasks and functions described above, such as one or more of the tasks or methods described above.

In addition, a storage medium may be provided that includes stored instructions, which when executed by a controller or processor may result in the controller 1304, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
receiving, at a mobile station from a base station in a frequency division duplex (FDD) wireless network in which mobile stations are assigned to one of a plurality of FDD groups, a group Map for a current FDD group of mobile stations, wherein a different modulation rate and coding scheme (MCS) is used by the base station to send different group Maps;

receiving, at the mobile station from the base station, a message including a group switch instruction instructing the mobile station to switch from the current FDD group to a new FDD group;

attempting, by the mobile station, to switch to the new FDD group in response to receiving the group switch instruction;

wherein the mobile station uses a timer and returns back to the current FDD group when the timer expires if the mobile station is unsuccessful in switching to the new FDD group; and sending, from the mobile station, an acknowledgement message that acknowledges either the success or failure of the attempting to switch to the new FDD group;

wherein the current FDD group of mobile stations receives in a downlink direction from the base station while the new FDD group of mobile stations transmits in an uplink direction to the base station.

2. The method of claim 1 wherein the sending comprises sending, from the mobile station, either a data packet, a control message or a management message, via a resource allocated by the base station from either the new FDD group, the current FDD group or other resource allocation.

3. The method of claim 1 wherein the sending comprises sending, from the mobile station, either a group switch acknowledgement message sent via new group resources that acknowledges that the mobile station has switched to the new FDD group if the mobile station attempting to switch to the new FDD group was successful, or a group switch negative acknowledgement message sent via current group resources that indicates that the mobile station has not switched to the new FDD group if the mobile station attempting to switch to the new FDD group was unsuccessful.

4. The method of claim 1 wherein the attempting to switch comprises attempting to decode a group Map of the new FDD group.

5. An apparatus comprising:

means for receiving, at a mobile station from a base station in a frequency division duplex (FDD) wireless network in which mobile stations are assigned to one of a plurality of FDD groups, a FDD group Map for a current group of mobile stations, wherein a different modulation rate and coding scheme (MCS) is used by the base station to send different group Maps;

means for receiving, at the mobile station from the base station, a message including a group switch instruction instructing the mobile station to switch from a current FDD group to a new FDD group;

means for attempting, by the mobile station, to switch to the new FDD group in response to receiving the group switch instruction;

wherein the mobile station uses a timer and is configured to return back to the current FDD group when the timer expires if the mobile station is unsuccessful in switching to the new FDD group; and means for sending, from the mobile station, an acknowledgement message that acknowledges either the success or failure of the attempting to switch to the new FDD group;

wherein the current FDD group of mobile stations receives in a downlink direction from the base station while the new FDD group of mobile stations transmits in an uplink direction to the base station.

6. A method comprising:

sending, from a base station in a frequency division duplex (FDD) wireless network in which mobile stations are assigned to one of a plurality of FDD groups, a plurality of group Maps, wherein a different modulation rate and coding scheme (MCS) is used by the base station to send different group Maps;

sending, from the base station to the mobile station in the FDD wireless network, a first message including a group switch instruction instructing the mobile station to switch from a current FDD group to a new FDD group; and receiving, at the base station from the mobile station, a second message that includes either a group switch acknowledgement message received via new FDD group resources that acknowledges that the mobile station has switched to the new FDD group, or a group switch negative acknowledgement message received via current FDD group resources that indicates that the mobile station has not switched to the new FDD group based upon the mobile station using a timer and, when the timer expires, returning to the current FDD group if the mobile station is unsuccessful in switching to the new FDD group.

7. The method of claim 6 wherein the receiving comprises receiving, at the base station from the mobile station, the second message that includes either a data packet, a control message or a management message that indicates either success or failure of the mobile station in switching to the new FDD group, the second message sent via a resource allocated by the base station from either the new FDD group, the current FDD group or other resource allocation.

8. The method of claim 6 and further comprising performing the following prior to the sending the first message:

receiving, at the base station from the mobile station, a Map decode capability indication (Map DCI) or preferred group indication (PGI); and determining, by the base station, the new group for the mobile station based on at least the Map DCI and/or the PGI received from the mobile station.

9. The method of claim 6 and further comprising, after expiration of a period of time since the sending the first message without receiving the second message at the base station from the mobile station, or upon receiving a group switch negative acknowledgement message: sending, from the base station to the mobile station via a current FDD group resource, a third message including a second group switch instruction instructing the mobile station to switch to, or remain with, the current FDD group.

10. A method comprising:

receiving, at a mobile station from a base station in a frequency division duplex (FDD) wireless network in which mobile stations are assigned to one of a plurality of FDD groups, a group Map for a current group of mobile stations, wherein a different modulation rate and coding scheme (MCS) is used by the base station to send different group Maps;

receiving, at the mobile station from the base station, a message including a group switch instruction instructing the mobile station to switch from a current FDD group to a new FDD group;

attempting, by the mobile station, to switch to the new FDD group in response to receiving the group switch instruction;

using a timer and returning to the current FDD group when the timer expires if the mobile station is unable to switch to the new FDD group; and performing the following if the mobile station is able to switch to the new FDD group:
  switching, by the mobile station, to the new FDD group in response to receiving the group switch instruction; and
  sending a group switch acknowledgement via a resource request message from the mobile station to the base station via uplink resources associated with the new FDD group.

11. The method of claim 10 wherein the switching comprises decoding a group Map of the new FDD group.

12. The method of claim 10 wherein the switching comprises:
  decoding a group Map of the new FDD group; and
  receiving data from the base station via downlink resources of the new FDD group.

13. The method of claim 10 and further comprising performing the following prior to receiving the group switch instruction:
  determining, by the mobile station, whether or not the mobile station can likely decode a group Map associated with the new FDD group from the base station; and
  sending, from the mobile station to the base station, a Map decode capability indication (Map DCI) indicating whether or not the mobile station can likely decode the group Map associated with the new FDD group.

14. The method of claim 10 and further comprising performing the following prior to receiving the group switch instruction:
  receiving, at the mobile station from the base station, group signals associated with the current FDD group and group signals associated with the new FDD group;
  determining a preferred FDD group based on the received signals; and
  sending a message from the mobile station to the base station including a preferred group indication (PGI) that indicates the preferred FDD group that is preferred by the mobile station.

15. The method of claim 10 wherein the resource request message comprises a zero resource request message.

16. A method comprising:
  receiving, at a mobile station from a base station in a frequency division duplex (FDD) wireless network in which mobile stations are assigned to one of a plurality of FDD groups, a group Map for a current group of mobile stations, wherein a different modulation rate and coding scheme (MCS) is used by the base station to send different group Maps;
  receiving, at the mobile station from the base station, a message including a group switch instruction instructing the mobile station to switch from a current FDD group to a new FDD group;
  determining, by the mobile station, that the mobile station is unable to switch to the new FDD group, wherein the mobile station uses a timer and returns back to the current FDD group when the timer expires after the mobile station is unable to switch to the new FDD group; and
  sending a group switch negative acknowledgement from the mobile station to the base station via a current FDD group resource indicating that the mobile station has not switched to the new FDD group.

* * * * *